United States Patent
Albertson et al.

(10) Patent No.: US 12,188,602 B1
(45) Date of Patent: Jan. 7, 2025

(54) SEALING PLUG ASSEMBLIES, LINE STOP ASSEMBLIES, AND YOKES WITH FLUID PATHWAYS FOR LINE STOPPING A PIPE AND METHODS FOR THE USE THEREOF

(71) Applicant: WeldFit LLC, Houston, TX (US)

(72) Inventors: David Albertson, Skiatook, OK (US); Brian Anderson, Tomball, TX (US); Paul Hatch, Edmond, OK (US); Ray Prater, Kiefer, OK (US); Joaquin Reyes Espinosa, Sand Springs, OK (US); Robert Niksich, Corpus Cristi, TX (US); Timothy Irelan, League City, TX (US); Brian Gresh, Tulsa, OK (US)

(73) Assignee: WELDFIT LLC, Houston, TX (US)

( * ) Notice: Subject to any disclaimer, the term of this patent is extended or adjusted under 35 U.S.C. 154(b) by 0 days.

(21) Appl. No.: 18/762,337

(22) Filed: Jul. 2, 2024

Related U.S. Application Data

(60) Provisional application No. 63/625,161, filed on Jan. 25, 2024.

(51) Int. Cl.
*F16L 55/105* (2006.01)
*F16L 55/18* (2006.01)

(52) U.S. Cl.
CPC ............ *F16L 55/105* (2013.01); *F16L 55/18* (2013.01)

(58) Field of Classification Search
CPC .... F16J 15/004; F16L 55/1018; F16L 55/105; F16L 55/124; F16L 55/1283; F16L 55/132; F16L 55/134; F16L 55/265

USPC .............................. 138/90, 94; 166/135, 191
See application file for complete search history.

(56) References Cited

U.S. PATENT DOCUMENTS

| | | | | |
|---|---|---|---|---|
| 3,568,721 A | * | 3/1971 | Ross | F28F 11/00 81/448 |
| 5,844,127 A | * | 12/1998 | Berube | F16L 55/132 73/49.8 |
| 7,240,697 B2 | * | 7/2007 | Beebe | G01M 3/022 138/93 |
| 7,681,591 B2 | * | 3/2010 | Lundman | F16K 7/10 285/190 |
| 7,841,364 B2 | * | 11/2010 | Yeazel | F16L 55/132 138/91 |
| 7,849,882 B1 | * | 12/2010 | Lee | F16L 55/124 138/91 |
| 7,866,347 B2 | * | 1/2011 | Bowie | G01M 3/2853 138/93 |

(Continued)

FOREIGN PATENT DOCUMENTS

| CN | 207569434 U | * | 7/2018 | .......... F16L 55/1141 |
|---|---|---|---|---|
| CN | 114962847 A | * | 8/2022 | ............. F16L 55/10 |

(Continued)

*Primary Examiner* — Kenneth Rinehart
*Assistant Examiner* — Richard K. Durden
(74) *Attorney, Agent, or Firm* — William R. Childs; Childs Patent Law PLLC

(57) ABSTRACT

The present disclosure provides a sealing plug assembly, a line stop assembly, and a yoke for stopping flow of a product in a pipe as well as methods of using the same. The sealing plug assembly, the line stop assembly, and the yoke include one or more fluid pathways. A benefit of the sealing plug assembly, the line stop assembly, and the yoke can be to remove product from an isolation zone of a stopped pipe through the one or more fluid pathways.

16 Claims, 10 Drawing Sheets

(56) References Cited

U.S. PATENT DOCUMENTS

| | | | | |
|---|---|---|---|---|
| 8,307,856 | B2 * | 11/2012 | Yeazel | F16L 55/1283 |
| | | | | 138/92 |
| 9,057,447 | B2 * | 6/2015 | Bowie | F16K 15/00 |
| 2014/0283926 | A1 * | 9/2014 | Duell | F16K 1/221 |
| | | | | 137/315.42 |
| 2020/0309308 | A1 * | 10/2020 | Naber | F16L 55/1141 |
| 2023/0392740 | A1 * | 12/2023 | Gresh | F16L 55/07 |

FOREIGN PATENT DOCUMENTS

| | | | | | |
|---|---|---|---|---|---|
| CN | 116025799 | A | * | 4/2023 | |
| KR | 20110102087 | A | * | 9/2011 | F16L 55/132 |
| KR | 20110128057 | A | * | 11/2011 | F16L 55/1604 |
| KR | 101873276 | B1 | * | 7/2018 | F16L 55/11 |
| WO | WO-2024108051 | A2 | * | 5/2024 | F16L 55/124 |

* cited by examiner

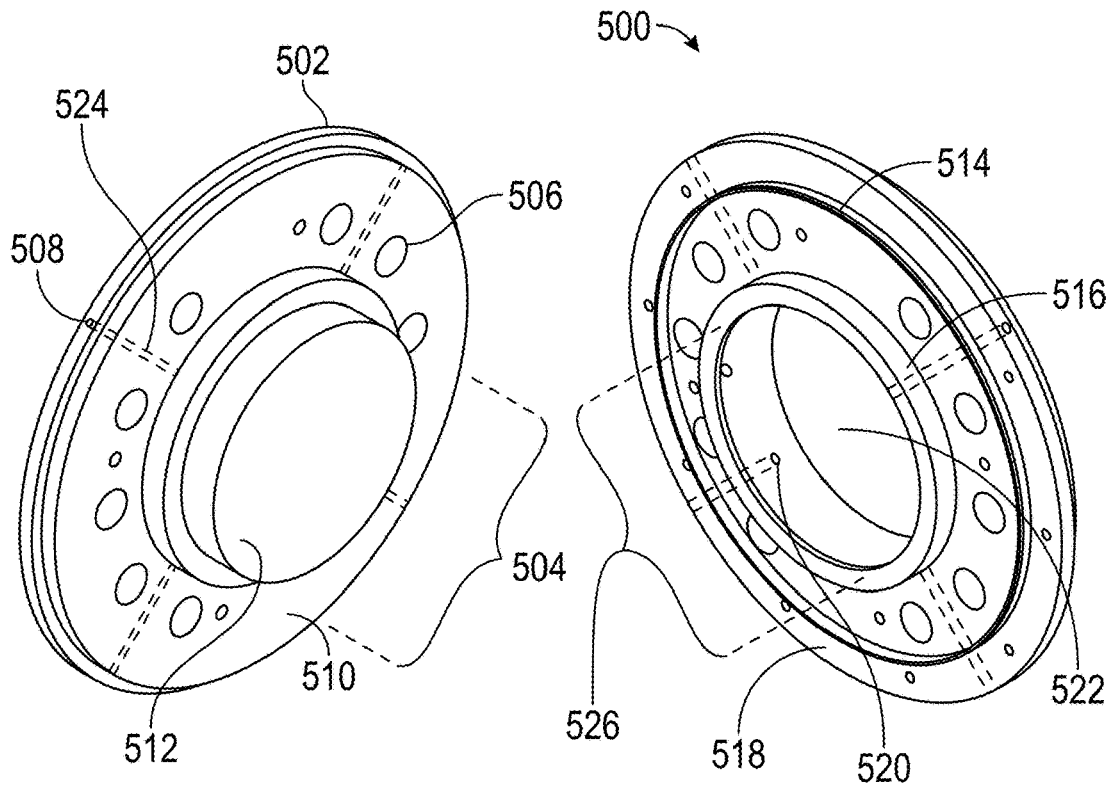
FIG. 5A
FIG. 5B
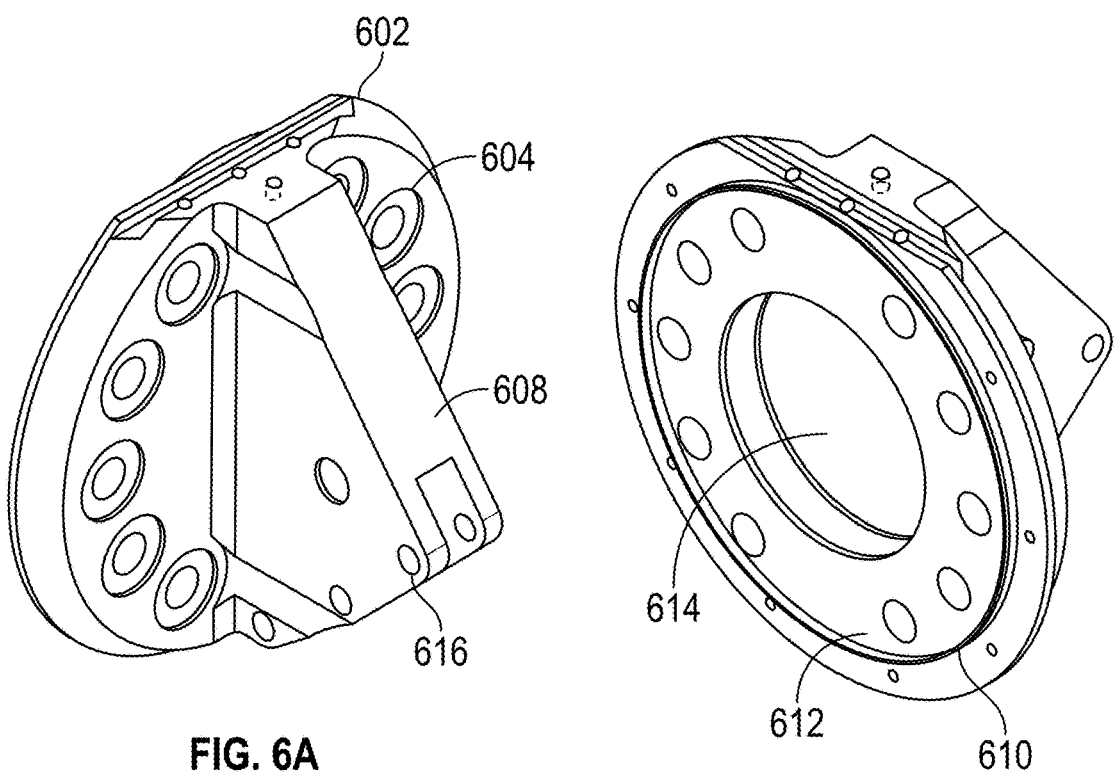
FIG. 6A
FIG. 6B

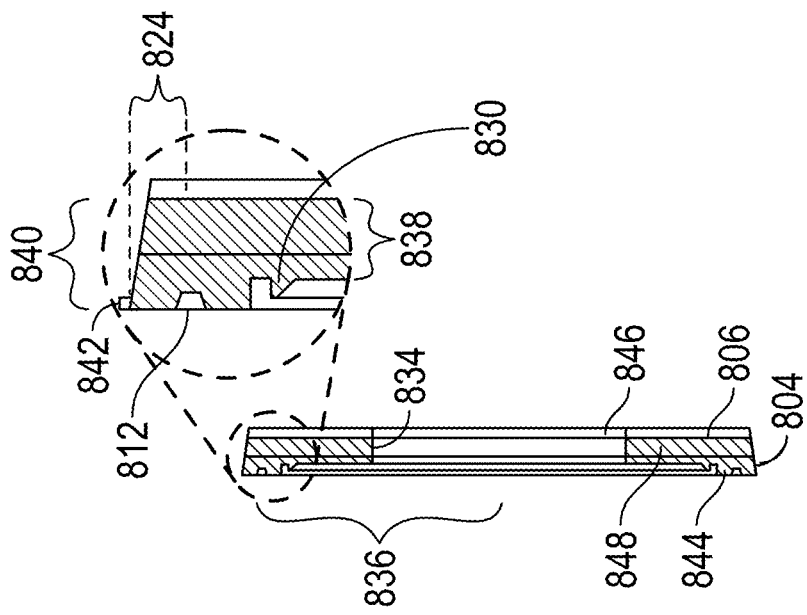
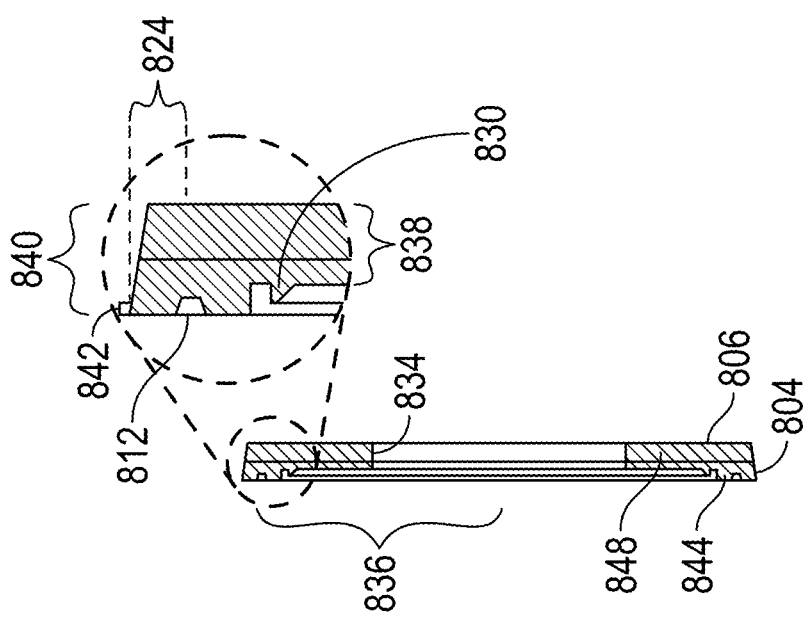

SEALING PLUG ASSEMBLIES, LINE STOP ASSEMBLIES, AND YOKES WITH FLUID PATHWAYS FOR LINE STOPPING A PIPE AND METHODS FOR THE USE THEREOF

CROSS-REFERENCE TO RELATED APPLICATIONS

This application is a non-provisional application and claims priority to U.S. Provisional Patent Application No. 63/625,161, entitled "SEALING PLUG ASSEMBLIES, LINE STOP ASSEMBLIES, AND YOKES WITH FLUID PATHWAYS FOR LINE STOPPING A PIPE AND METHODS FOR THE USE THEREOF," filed on Jan. 25, 2024, the entirety of which is incorporated by reference.

TECHNICAL FIELD

The present disclosure relates to the field of pipes as well as products, systems, and methods of repairing pipes, especially when those pipes are in use and continue to carry gases, liquids, or slurries.

BACKGROUND

It is often necessary to cut into a pipeline to make repairs downstream while the pipeline is in use and contains product. For example, once a nuclear power reactor is operating, it can be difficult or impossible to quickly stop the reactor. Therefore, it is critical that water used to cool the reactor be allowed to flow unimpeded, even during repairs and maintenance of pipes. Similarly, stopping production of an oil pipeline could delay production, resulting in lost profits. Having to stop the use of a water pipe or a sewage pipe could result in a loss of service during repairs and require re-sanitization of the entire process apparatus before pumping can resume.

Fortunately, methods have been developed that allow for pipes to be safely diverted during use so that repairs and maintenance can take place. This process is known in the industry as "hot-tapping" or "line stopping." This hot-tapping process involves fixing a fitting, such as a split-T fitting, around the pipe, cutting and removing a portion of the pipe (known as a "coupon") using a hole saw to allow access to the pipe, and then inserting a plug assembly into the pipe so as to stop the flow of product from upstream to downstream in the pipe while diverting that flow of product through the split-T fitting and a pipe or outlet attached thereto. This procedure stops the flow of product downstream of the pipeline, so that the downstream pipe can be repaired, or a maintenance routine can be performed, with minimal interruption.

Once the downstream repair or maintenance is finished, the process can be reversed. That is, the plug assembly can be withdrawn from the pipe through the split-T fitting, and a completion plug emplaced to seal the pipe. This method restores the flow of the product from the upstream side of the pipe to the downstream side of the pipe.

Considering the importance of line stopping in modern industry, it is desirable to improve the tools, methods, and systems used for line stopping so that line stopping can be made safer and more efficient under various field conditions, such as high-pressure conditions. It remains desirable to provide products, methods, and systems for line-stopping that better avoid leaks during an operation and maximize the amount of product safely recovered.

SUMMARY

A sealing plug assembly is provided herein. In some embodiments, a sealing plug assembly includes: a yoke, wherein the yoke includes a yoke proximal end and a yoke distal end, wherein the yoke distal end includes a distal yoke face, wherein the distal yoke face includes a plurality of yoke bolt holes positioned around a raised yoke portion, wherein the raised yoke portion includes a raised yoke face, wherein the yoke includes a yoke fluid passageway, wherein the yoke fluid passageway connects a distal yoke port to a proximal yoke port, and wherein the distal yoke port is located on the raised yoke face.

In some embodiments, the sealing plug assembly includes a proximal sealing element, a distal sealing element, an isolation plate, and a nose piece, wherein the proximal sealing element is located closer to the yoke than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element. In some embodiments of the sealing plug assembly, the distal yoke face is flat; or wherein the distal yoke face is circular; or wherein the raised yoke face is flat; or wherein the raised yoke face is circular; or wherein the raised yoke face is located in a center of the distal yoke face; wherein the proximal yoke port is located on a side of the yoke; or wherein the proximal yoke port is located closer to the yoke proximal end than the yoke distal end; or any combination thereof. In some embodiments of the sealing plug assembly, the proximal yoke port includes or is attached to a swivel fitting, wherein the swivel fitting is capable of rotating or swiveling about the proximal yoke port; or wherein the yoke includes a yoke filter across the yoke fluid passageway, and wherein the yoke filter is located closer to the distal yoke port than the proximal yoke port.

Aline stop assembly is disclosed herein. In some embodiments, the line stop assembly includes a sealing plug assembly, as discussed above, and a housing, wherein the housing includes a housing port that connects an inner housing port to a bleed valve, wherein the inner housing port is located on an inner surface of the housing and the bleed valve is located on an outer surface of the housing, and a bleed tubing, wherein the bleed tubing connects the proximal yoke port to the inner housing port. In some embodiments, the line stop assembly includes comprising a plugging head, wherein the plugging head includes the yoke connected by a pin to a control bar head, and wherein the yoke is capable of pivoting about the yoke proximal end relative to the control bar head, and wherein the control bar head connects to a control bar, and the control bar extends through a top of the inner surface of the housing, wherein the top of the inner surface of the housing contains a housing guide, wherein the housing guide protrudes a housing guide distance from the inner surface of the housing toward the control bar head, and wherein the control bar head includes a control bar head pocket, wherein the control bar head pocket recesses a control head pocket depth within the control bar head away from the housing guide. In some embodiments of the line stop assembly, wherein the bleed valve is connected to a bleed pressure gauge, or wherein the bleed valve is open to an ambient environment or connected to a container, or any combination thereof. In some embodiments, the line stop assembly includes a proximal sealing element, a distal sealing element, an isolation plate, and a nose piece, a housing, and a bleed tubing, wherein the proximal sealing element is located closer to the yoke than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, wherein the isolation plate is contained in an interior of the sealing plug assembly and located between the proximal sealing element and the distal sealing element, wherein the housing includes a housing port that connects an inner housing port to a bleed valve, wherein the inner housing port is located on an inner surface of the housing and the bleed valve is located on an outer surface of the housing, and wherein the isolation plate includes a cylindrical raised portion on a distal face of the isolation plate, a cylindrical recessed portion on a proximal face of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical recessed portion of the isolation plate, and wherein a plate isolation zone is a space located between the isolation plate and the raised yoke face; and wherein the isolation radial port is fluidly connected by the radial fluid pathway to the isolation zone port, wherein the isolation zone port is fluidly connected by the plate isolation zone to the distal yoke port, wherein the distal yoke port is fluidly connected to the proximal yoke port by the yoke fluid passageway, wherein the proximal yoke port is fluidly connected to the inner housing port by the bleed tubing, and wherein the housing port is fluidly connected to the bleed valve; or wherein the isolation radial port is fluidly connected to the bleed valve.

A yoke for a sealing plug assembly is provided herein. In some embodiments, the yoke includes a yoke, wherein the yoke includes a yoke proximal end and a yoke distal end, wherein the distal end includes a distal yoke face, wherein the distal yoke face includes a plurality of yoke bolt holes positioned around a raised yoke portion, wherein the raised yoke portion includes a raised yoke face, wherein the yoke contains a yoke fluid passageway, wherein the yoke fluid passageway connects a distal yoke port to a proximal yoke port, and wherein the distal yoke port is located on the raised yoke face.

A method of stopping a pipe containing a product is provided herein. In some embodiments, the method includes providing a sealing plug assembly, wherein the sealing plug assembly includes a yoke, a proximal sealing element, a distal sealing element, an isolation plate, and a nose piece, wherein the yoke includes a yoke proximal end and a yoke distal end, wherein the distal end includes a distal yoke face, wherein the distal yoke face includes a plurality of yoke bolt holes positioned around a raised yoke portion, wherein the raised yoke portion includes a raised yoke face, wherein the yoke contains a yoke fluid passageway, wherein the yoke fluid passageway connects a distal yoke port to a proximal yoke port, and wherein the distal yoke port is located on the raised yoke face; wherein the proximal sealing element is located closer to the yoke than the distal sealing element, and wherein the proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element; and stopping the pipe containing the product by sealing an outer edge of the proximal sealing element and an outer edge of the distal sealing element against an interior surface of the pipe.

In some embodiments, the method includes providing a line stop assembly, wherein the line stop assembly includes the sealing plug, as discussed above, and a housing and a bleed tubing, and wherein the housing includes a housing port that connects an inner housing port to a bleed valve, wherein the inner housing port is located on an inner surface of the housing and the bleed valve is located on an outer surface of the housing, and wherein the isolation plate includes a cylindrical raised portion on a distal face of the isolation plate, a cylindrical recessed portion on a proximal face of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical recessed portion of the isolation plate, and wherein a plate isolation zone is a space located between the isolation plate and the raised yoke face. In some embodiments, the method includes forming an isolation zone between an interior of the pipe and the isolation plate by stopping the pipe; and removing the product from the isolation zone by flowing the product from the isolation zone to the bleed valve. In some embodiments, the method includes flowing the product from the isolation zone to the bleed valve by flowing the product from the isolation zone into the radial fluid pathway, from the radial fluid pathway into the plate isolation zone, from the plate isolation zone into the yoke fluid passageway, from the yoke fluid passageway into the bleed tubing, from the bleed tubing into the inner housing port, and from the inner housing port to the bleed valve. In some embodiments, the method includes flowing the product from the bleed valve into a container; or flowing a gas or a liquid from the bleed valve into the isolation zone; or flowing the product from the bleed valve into a container, and then flowing a gas or liquid from the bleed valve into the isolation zone.

BRIEF DESCRIPTION OF THE DRAWINGS

The foregoing summary, as well as the following detailed description of the embodiments, will be better understood when read in conjunction with the attached drawings. For the purpose of illustration and evidence, there are shown in the drawings, some embodiments, which may be preferable. It should be understood that the embodiments depicted are not limited to the precise details shown. Moreover, the embodiments depicted are not drawn to scale.

FIG. 5A shows a front, off-axis view of an embodiment of an isolation plate.

FIG. 5B shows a back, off-axis view of the isolation plate of FIG. 5A.

FIG. 6A shows a front, off-axis view of an embodiment of a nose piece.

FIG. 6B shows a back, off-axis view of the nose piece of FIG. 5A.

FIG. 8D shows a cutaway side view of the sealing element of FIG. 8A.

FIG. 8E shows a cutaway side view of an embodiment of a sealing element of the sealing plug assembly.

DETAILED DESCRIPTION

Figure 1:
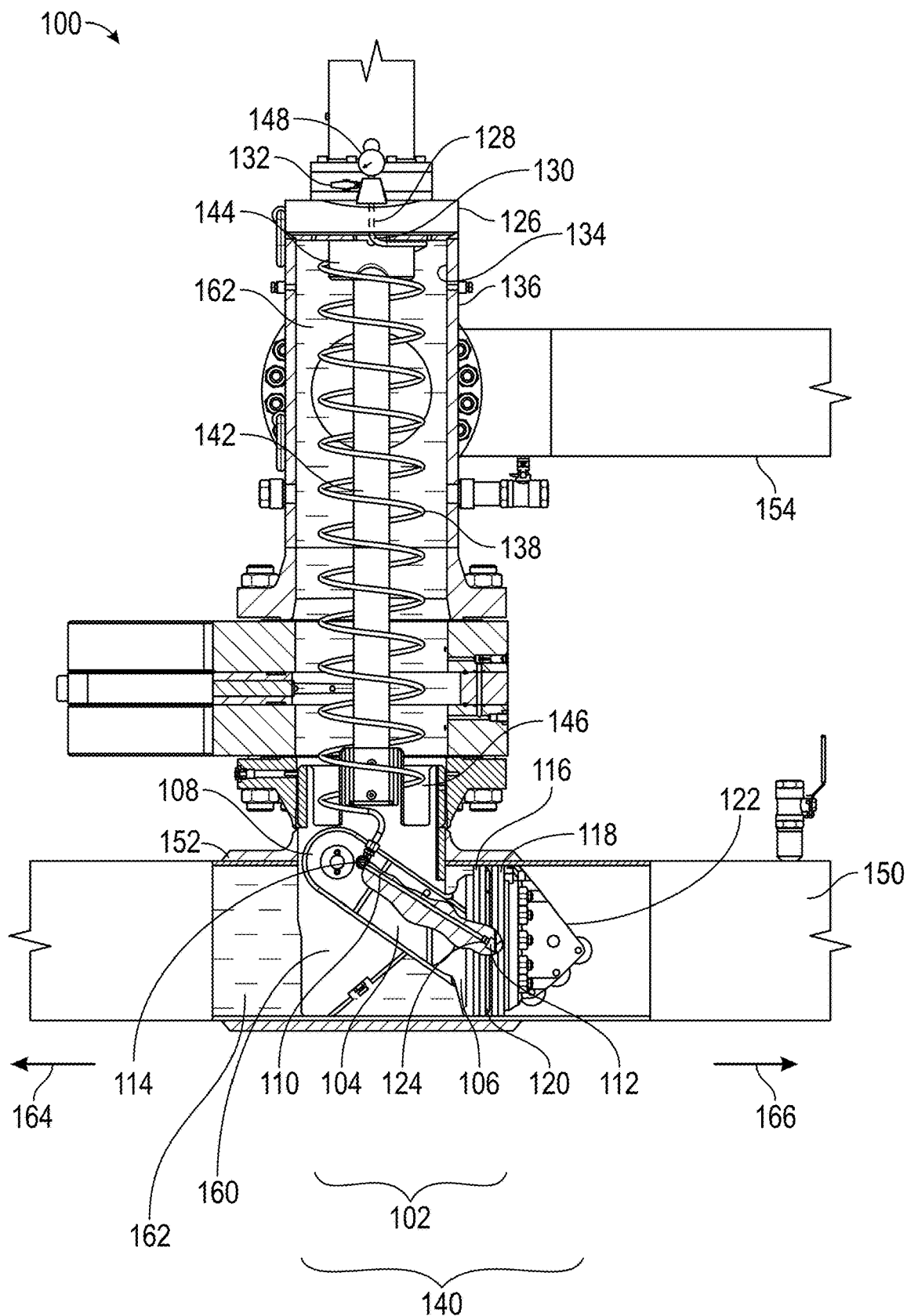
FIG. 1 shows a side cutaway view of an exemplary embodiment of a line stop assembly containing an embodiment of a sealing plug assembly for stopping a pipe containing a liquid or gas product, where the sealing plug is in a sealing position, as it would upon sealing of a pipe, in accordance with embodiments of the present disclosure.

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one of the inner edge, outer edge, and circular groove of the proximal sealing element is coaxial with the exterior of the sealing plug assembly" means one inner edge, two or more inner edges, one outer edge, two or more outer edges, one circular groove, two or more circular grooves, or any combination thereof.

Unless otherwise noted, the term "about" refers to +10% of the non-percentage number that is described, rounded to the nearest number to the accuracy shown. For example, about 105.3 mm, would include 94.8 to 115.8 mm. Unless otherwise noted, the term "about" refers to +5% of a percentage number. For example, about 20% would include 15 to 25%. When the term "about" is discussed in terms of a range, then the term refers to the appropriate amount less than the lower limit and more than the upper limit rounded to the nearest number to the accuracy shown. For example, from about 100 mm to about 200 mm would include from 90 to 220 mm.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, the terms "fluidly" and "fluidically" are used interchangeably.

Unless otherwise noted, the term "fluidly connected" refers to two or more objects connected by a fluid passageway such that a fluid is capable of flowing from one named object to another named object, but two or more objects referred to may not be direct in physical contact with one another. For example, the two or more objects may be separated by one or more intermediate objects that include a fluid passageway. A port or inlet can be fluidly connected to a pressure valve by one or more objects that include a fluid passageway, such as tubes or pipes. A port or inlet can be fluidly connected to a pressure valve even though the fluid passageway connecting them can be reversibly opened or closed by a fluid passageway control mechanism, such as a valve.

Unless otherwise noted, the term "yoke" refers to any solid frame or scaffold capable of having one or more sealing elements mounted onto it.

Unless otherwise noted, the term "proximal" refers to the relative proximity of an object or portion of an object of the sealing plug assembly to the attachment point of the yoke to the control bar head.

Unless otherwise noted, the term "distal" refers to the relative proximity of an object or portion of an object to the nose piece of the sealing plug assembly.

Conventional sealing plugs for pipes are often solid metal plugs having one sealing element protruding around the circumference of the sealing plug. During operation, the sealing plug is inserted into the pipe interior and the one and only sealing element of the sealing plug is pressed against an interior surface of the pipe to form a seal. Generally, conventional sealing plugs are satisfactory for plugging operations of liquids or gases at low pressures.

However, when the pressure approaches or exceeds about 6,894 kPa (1,000 PSI), then conventional sealing plugs tend to fail or leak past their single sealing element. Such a failure or leak can result in a significant safety hazard for personnel working downstream of the plugging operation. For example, if the product is a flammable liquid, then a leak could lead to an accidental explosion. Similarly, if the product is a caustic liquid or a carcinogenic liquid, then a failure or leak could lead to chemical burns or cancer-causing contamination of workers. This situation tends to be even more precarious if the pipe being stopped contains solid debris, such as sand, dirt, or other solids, that might interfere with a tight seal of the one sealing element. Another safety threat can arise if some part of the product attacks or swells the material of the one sealing element because that would likely compromise the structural integrity of the one seal of conventional sealing plugs. In summary, conventional sealing elements usually place one and only one sealing element between a plugging operation and a potential accident that can jeopardize worker safety or reduce profits.

It has been discovered that it is possible to create a sealing plug assembly having 2 separate sealing elements. A benefit of a sealing plug assembly having 2 separate sealing elements can be that the 2 separate sealing elements are capable of withstanding higher pressures that meet or exceed 1000 PSI. Another benefit of a sealing plug assembly having 2 separate sealing elements can be that an accidental leak in one sealing element does not completely compromise downstream workers because there is a redundant sealing element, upstream or downstream of the leaking sealing element, built into the sealing plug assembly.

Further, it was discovered that this design change leads to additional opportunities. It was noticed that when the sealing plug assembly was designed to include 2 (or more) sealing elements, then the sealing plug assembly traps or isolates product between the 2 separate sealing elements. It has been discovered that it is possible to design an isolation zone within the sealing plug assembly that can efficiently isolate the trapped product within the isolation zone so that the product can be removed or harvested.

To harvest product trapped in the isolation zone, previous research efforts focused on a nose piece of the sealing element assembly designed to have a channel or passage that operatively or fluidly connected the isolation zone between the sealing elements to a product port in the nose of the sealing plug assembly. By making the product port externally accessible on the outside of the nose piece, the product port was accessed by drilling a hole into the pipe downstream of the sealing plug assembly and inserting a bleed lance into the product port so as to access and harvest the product from the isolation zone of the sealing plug assembly.

It has now been discovered that a yoke, sealing plug assembly, and line stop assembly can be designed to have a channel or series of fluid passageways that operatively or fluidly connects the isolation zone through the yoke and a bleed tubing to an external bleed valve located on the housing of the line stop assembly. This design effectively creates a series of connected fluid pathways that connect the isolation zone formed between the sealing plug and the inner pipe surface of a pipe to a bleed valve and bleed pressure gauge located on an outer surface of the housing.

To put this advance into perspective, the previous design could only remove product from the isolation zone by using a separate bleed lance, and one or more operators to perform the operation of drilling a hole in the pipe being line stopped and to manually insert the bleed lance into the product port of the nose piece. In contrast, using the line stop assembly, sealing plug assembly, and yoke disclosed herein, the channel or series of fluid passageways that operatively or fluidly connect the isolation zone to the pressure valve pass through the yoke and the housing to a bleed valve located on the housing. Therefore, one benefit of the sealing plug assembly disclosed herein can be recovering product from the isolation zone while eliminating the need for a separate pipe drilling operation, a separate bleed lance, and the separate operation of manually inserting the bleed lance.

Once the product is removed from the isolation zone, the isolation zone can act as a further hindrance against leaking because the isolation zone creates a third barrier between upstream or proximal sealing element and the downstream or distal sealing element. For example, the isolation zone can be backfilled with a liquid, a gas, or vacuum. Further, if the fluid product were to leak from the upstream seal into the isolation zone between the 2 sealing elements, then with the isolation zone free of any product, there should be little or no pressure on the downstream sealing element (for a duration of the time it takes the leak in the upstream sealing element to fill the isolation zone).

Also, the bleed pressure gauge can monitor or reduce any pressure that may build up in the isolation zone continuously or in real-time through the series of connected fluid passageways.

Going back to conventional sealing plugs, conventional sealing plugs typically contain a sealing element having a flat elastomeric surface. These conventional sealing elements typically require that the sealing plug be actively pressed against the interior surface of the pipe so as to firmly press and conform the surface of the sealing element against the interior of the pipe.

It has been discovered that a sealing element can be improved by forming a circular groove or circular depression into the elastomeric face of the sealing element at a distance that would be expected to protrude from the sealing element assembly but not so close to the edge of the sealing element that it would compromise or interfere with the ability of the outer edge of the sealing element to form a seal against the pipe interior. A sealing element having such a circular groove has been found to form seals more easily and more securely than a sealing element without such a circular groove. Without wishing to be bound by theory, it is believed that the circular groove and reduced thickness of the seal make the seal more forgiving as it enters the pipe and therefore it remains intact better to create the seal.

A line stop assembly, a sealing plug assembly, a yoke for a sealing plug assembly, and methods for using the same are disclosed herein. An exemplary embodiment of the line stop assembly, containing an exemplary embodiment of the sealing plug assembly, for stopping a pipe or pipeline containing a product is discussed below.

Figure 2:
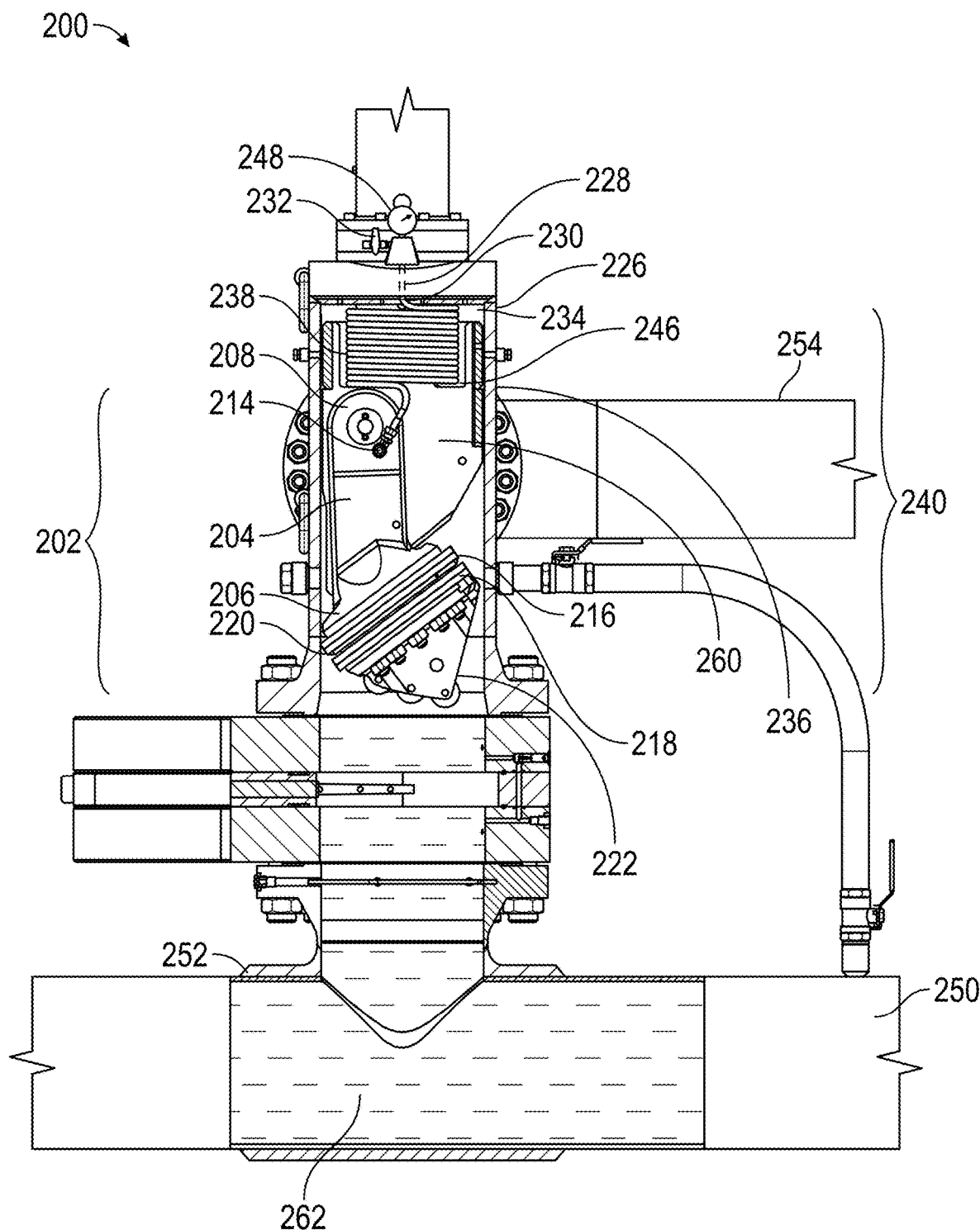
FIG. 2 shows a side cutaway view of the line stop assembly of FIG. 1, with the sealing plug assembly in an extended position, as it would be during insertion into a pipe, in accordance with embodiments of the present disclosure.

Referring to FIGS. 1 and 2, an embodiment of a line stop assembly 100, 200 containing an embodiment of the sealing plug assembly 102, 202 for stopping a pipe 150, 250 containing a liquid or gas product 162, 262 is shown. FIG. 1 depicts a contracted configuration of the sealing plug assembly in the line stop assembly during a plugging step of a line stop operation. FIG. 2 shows the line stop assembly of FIG. 1, except the sealing plug assembly is in an extended configuration during an insertion step, just prior to the plugging step in FIG. 1. In this embodiment, the sealing plug assembly includes a yoke 104, 204 having a yoke distal end 106, 206 and a yoke proximal end 108, 208, wherein the yoke includes a yoke fluid passageway 110 that connects a yoke distal port 112 to a yoke proximal port 114, 214. A yoke filter 124 extends across the yoke fluid passageway and is positioned closer to the yoke distal end than the yoke proximal end. The sealing plug assembly further includes a proximal sealing element 116, 216, a distal sealing element 118, 218, an isolation plate 120, 220, and a nose piece 122, 222 mounted on the yoke distal end. The yoke proximal end is mounted on a control bar head 160, 260, and the control bar head is mounted on a control bar 142, which extends through the housing 126, 226. The line stop assembly includes a bleed tubing 138, 238 connected to the yoke proximal port that extends along and around the control bar up through the housing to an inner housing port 130, 230 located on an inner housing surface 134, 234. The inner housing port connects to a housing port 128, 228, wherein the housing port extends through the housing to a housing outer surface 136, 236. The housing port connects to a bleed valve 132, 232, which is connected to a bleed pressure gauge 148, 248. The control bar head has a control bar head pocket 146, 246 located on a top of the control bar head that is complementary to a tubing guide 144 located on a top of the housing and positioned around the location where the control bar extends through the housing. As shown in FIG. 2, a benefit of a control bar head pocket and the tubing guide can be to guide and provide a storage area for the bleed tubing during insertion, removal, or storage of the sealing plug assembly. During the plugging step, the plugging head 140, 240, mounted on a control bar head 160, 260, is inserted into a pipe 150, 250 through an opening in a pipe fitting 152, 252 (split-T fitting) to divert a product 162 flowing from an upstream direction 164 toward a downstream direction 166 up through the housing and into a bypass line 154, 254 by plugging the pipe.

Figure 3A:
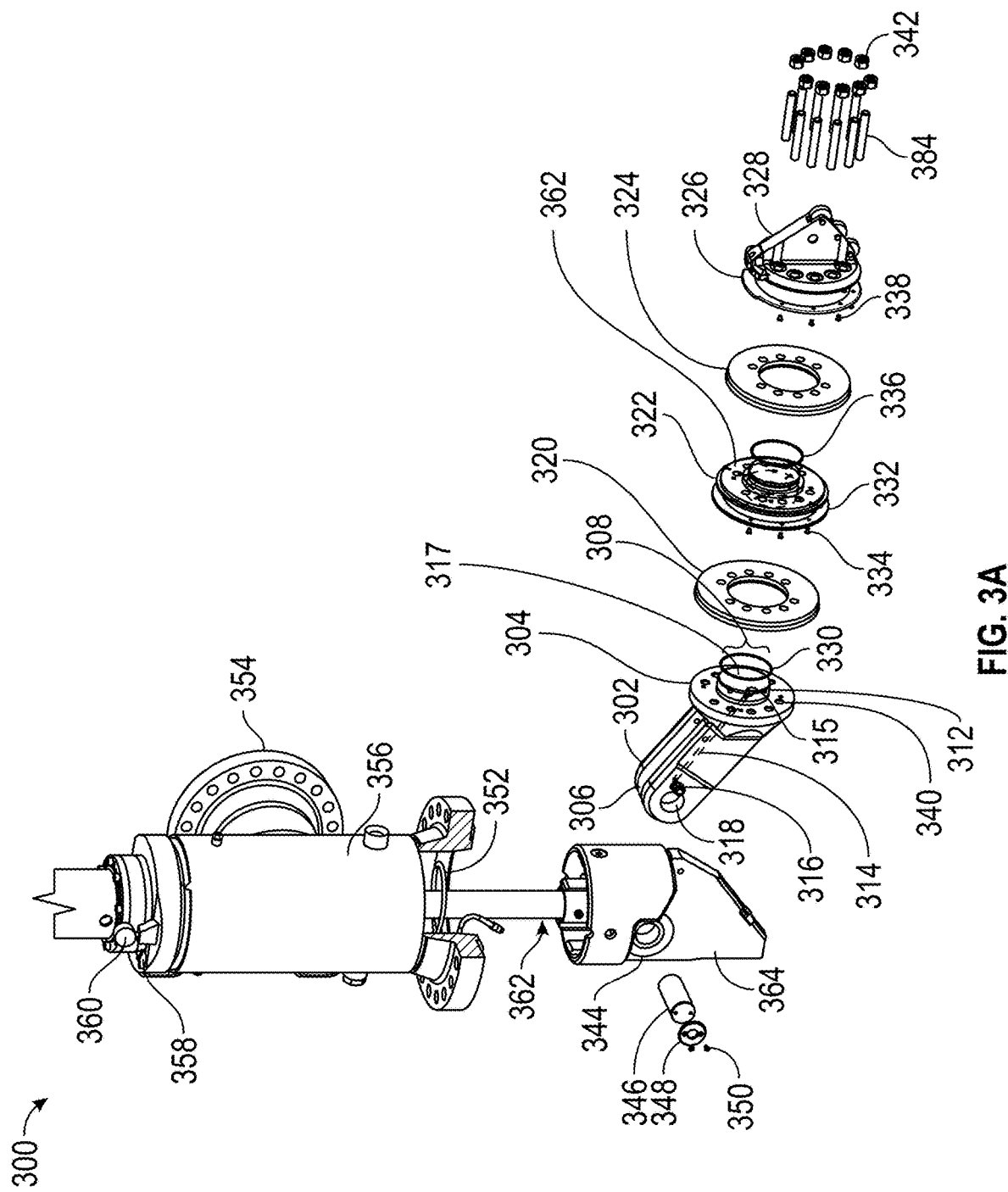
FIG. 3A shows an exploded diagram of the exemplary embodiment of the line stop assembly of FIGS. 1 and 2, in accordance with embodiments of the present disclosure.
Figure 3B:
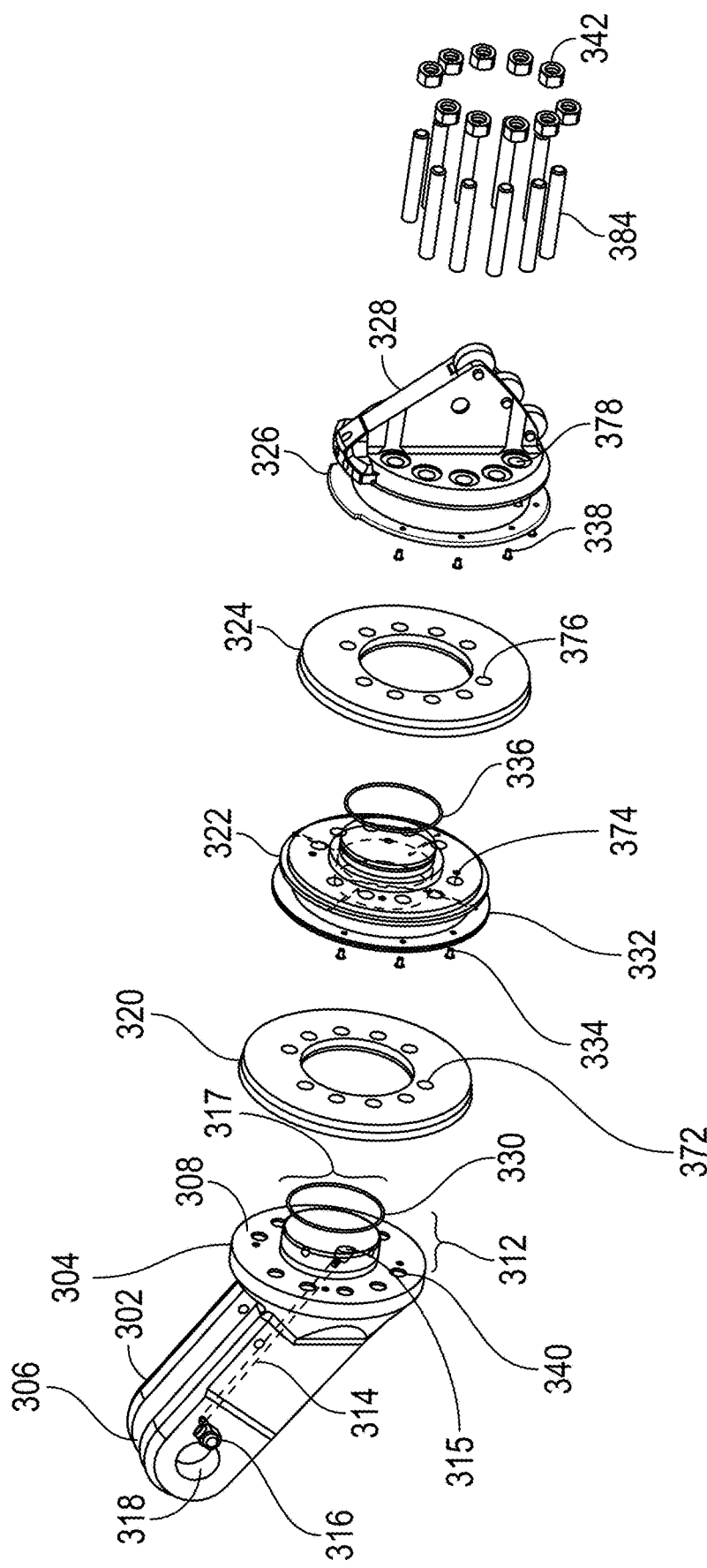
FIG. 3B shows an exploded diagram of the yoke and sealing plug from FIG. 3A.

To provide more detail, FIGS. 3A and 3B present exploded diagrams. Referring to FIG. 3A, the line stop assembly 300 includes a housing 356 having a bypass pipe 354 extending from a side of the housing and having a bleed valve 358 and bleed pressure gauge 360 mounted on top of the housing with a bleed tubing 352 extending down and around a control bar 362. The control bar connects to a control bar head 364. The yoke 302 can be mounted onto the control bar head by inserting a pivot pin 346 through the control bar pin hole 344 and into the pinhole 318 found on the yoke proximal end 306. The pivot pin can be secured into position by a pivot pin washer 348 and pivot pin washer bolts 350.

Referring to FIGS. 3A and 3B, the yoke 302 includes a yoke proximal end 306 and a yoke distal end 304, wherein the yoke distal end includes a distal yoke face 308 having a plurality of yoke bolt holes 340 positioned around a raised yoke portion 312. The raised yoke portion includes a raised yoke face 317 having a distal yoke port 315 located on raised yoke face. The yoke includes a yoke fluid passageway 314 that connects a distal yoke port 315 to a proximal yoke port 316. The yoke proximal end includes a yoke pin hole 318. The proximal sealing element 320, isolation plate 322, distal sealing element 324, and nose piece 328 are mounted onto the raised yoke portion of the yoke. The yoke distal end is sealed to the isolation plate by a yoke O-ring 330. The isolation plate is sealed to the nose piece by the isolation plate O-ring 336. A proximal nose ring 332 is fastened to a proximal side of the isolation plate by proximal nose ring bolts 334. A distal nose ring 326 is secured to a proximal side of the nose piece 328 by distal nose ring bolts 338. Sealing plug studs 384 can be inserted through nose bolt holes 378 in the nose piece, through distal sealing element bolt holes 376 in the distal sealing element, through isolation plate bolt holes 374 in the isolation plate, through proximal sealing element bolt holes 372 in the proximal sealing element, and into the yoke bolt holes 340 on the distal yoke face to fasten these parts in place utilizing sealing plug nuts 342.

Figure 4A:
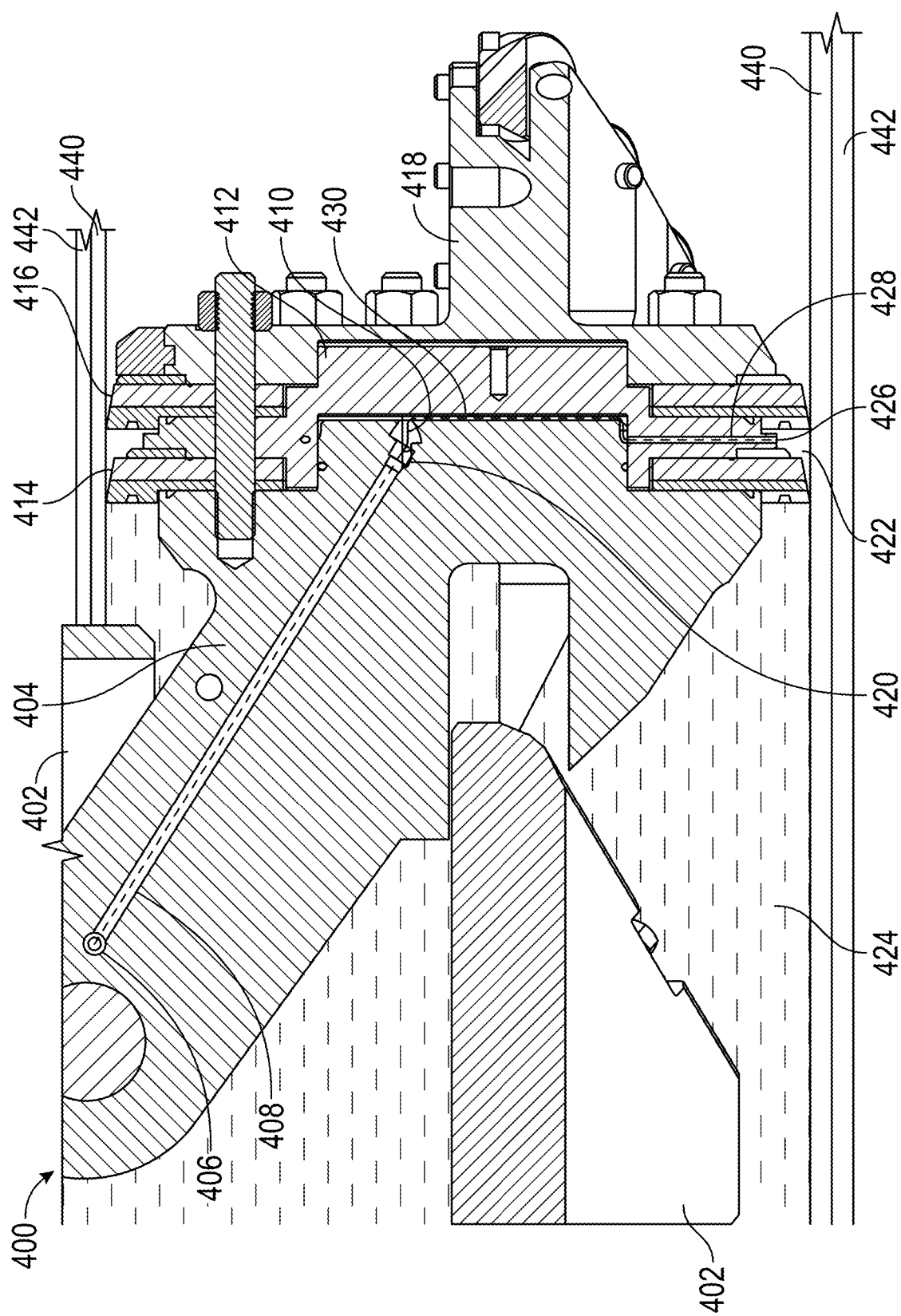
FIG. 4A shows a cutaway view of an embodiment of a sealing plug assembly in a sealing position, as it would upon sealing of a pipe, in accordance with embodiments of the present disclosure.
Figure 4B:
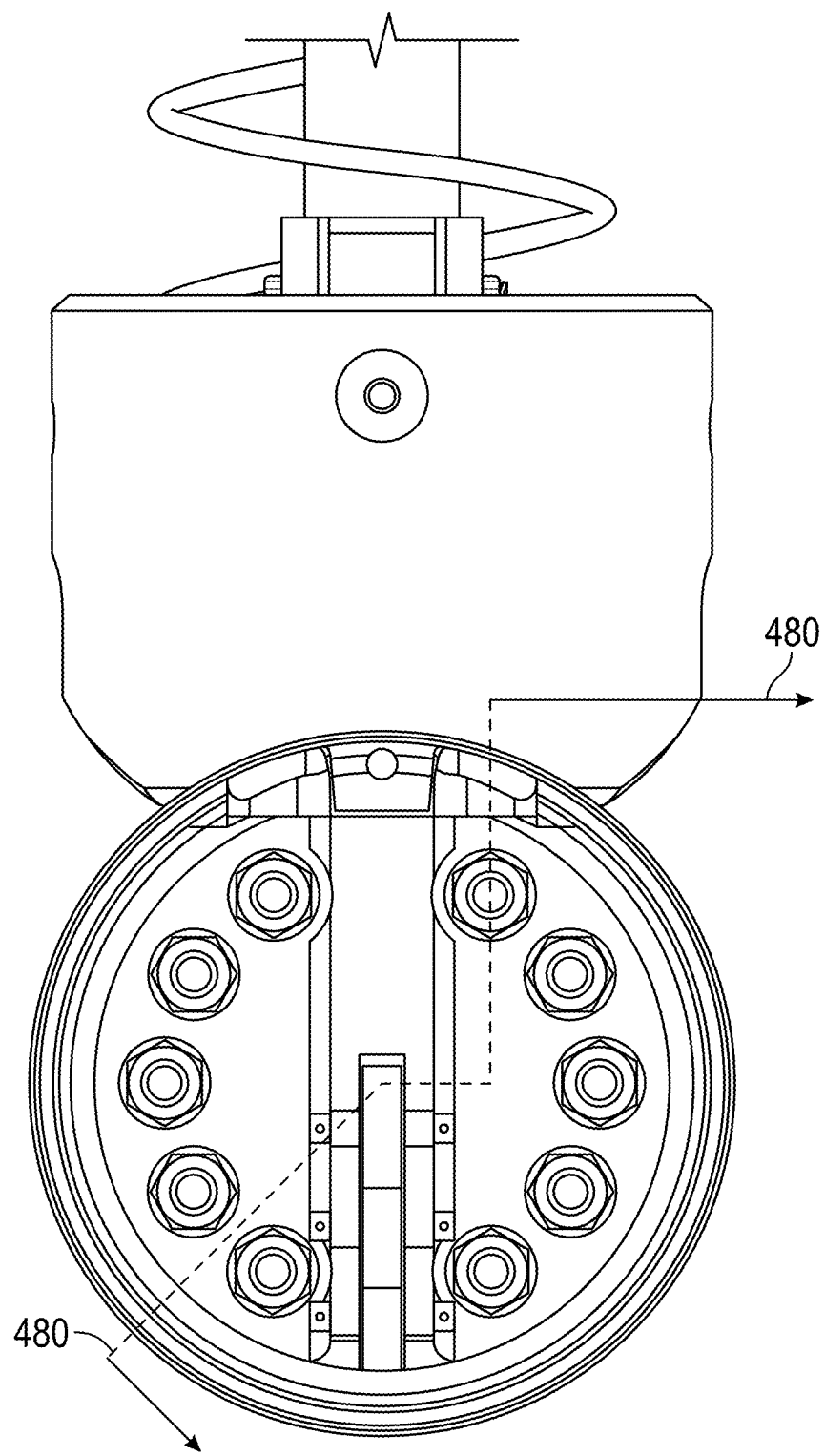
FIG. 4B shows the cutting plane used to render FIG. 4A from a front, on-axis view of the sealing plug assembly.

FIG. 4A provides a cutaway schematic depiction of an embodiment of the sealing plug assembly 400 as it is sealed within a pipe 440. However, for illustration purposes, FIG. 4A does not present a cutaway view that is straight from top to bottom (or perpendicular to the viewer). Instead, as shown in FIG. 4B looking from the front of the sealing plug down a central axis, FIG. 4A shows a cutaway view along a cutting plane 480.

In FIG. 4A, a sealing plug assembly 400 is inserted into a pipe 440, surrounded by a pipe fitting 442, wherein the sealing plug assembly includes a yoke 404, mounted on a control bar head 402. The sealing plug assembly further includes an isolation plate 412 located between a proximal sealing element 414 and a distal sealing element 416, which are located between a nose piece 418 and the yoke 404. When the sealing plug assembly 400 is inserted into the pipe 440 and the proximal sealing element 414 and distal sealing element 416 are pressed against the pipe, then an isolation zone 422 is created by the space bounded by the proximal sealing element, the distal sealing element, the pipe, and the isolation plate. Product 424 trapped in the isolation zone 422 between the proximal sealing element 414 and the distal sealing element 416 can flow through an isolation plate radial port 426 through a radial fluid pathway 428 into isolation plate zone 430. The isolation plate zone 430 is located between the isolation plate 412 and the yoke 404.

Any product trapped in the isolation plate zone 430 can flow into the yoke distal port 410 and through the yoke fluid passageway 408 to a yoke proximal port 406.

FIG. 5A shows a front, off-axis view of an embodiment of an isolation plate 500. FIG. 5B shows a back, off-axis view of the isolation plate from FIG. 5A. Referring to FIG. 5A, the isolation plate 500 has a distal face of the isolation plate 510 having a plurality of isolation plate bolt holes 506. The isolation plate has a cylindrical raised portion 504 having a cylindrical raised portion top 512. Referring to FIG. 5B, the isolation plate has a proximal face of the isolation plate 518. On the proximal face of the isolation plate, the isolation plate has an isolation plate raised outer ring 514 surrounding an isolation plate raised inner ring 516, wherein the isolation plate raised inner ring surrounds a cylindrical recessed portion 526 having an isolation plate recessed bottom 522. Referring to FIGS. 5A and 5B, the isolation plate has isolation plate radial ports 508 located along the outer edge of the isolation plate 502. The isolation radial ports 508 are connected to isolation zone ports 520 located inside of the cylindrical recessed portion 526 by radial fluid passageways 524.

FIG. 6A shows a front, off axis view of a nose piece of the sealing plug assembly. FIG. 6B, shows a back, off-axis view of the nose piece shown in FIG. 6A. The nose piece 602 has a plurality of nose piece bolt holes 604 that surround a nose 608, wherein the nose has one or more nose piece roller pin holes 616. The back of the nose piece 612 or proximal side of the nose piece has a nose piece raised ring 610 surrounding the nose piece bolt holes 604 and the nose piece recessed portion 614.

Figure 7A:
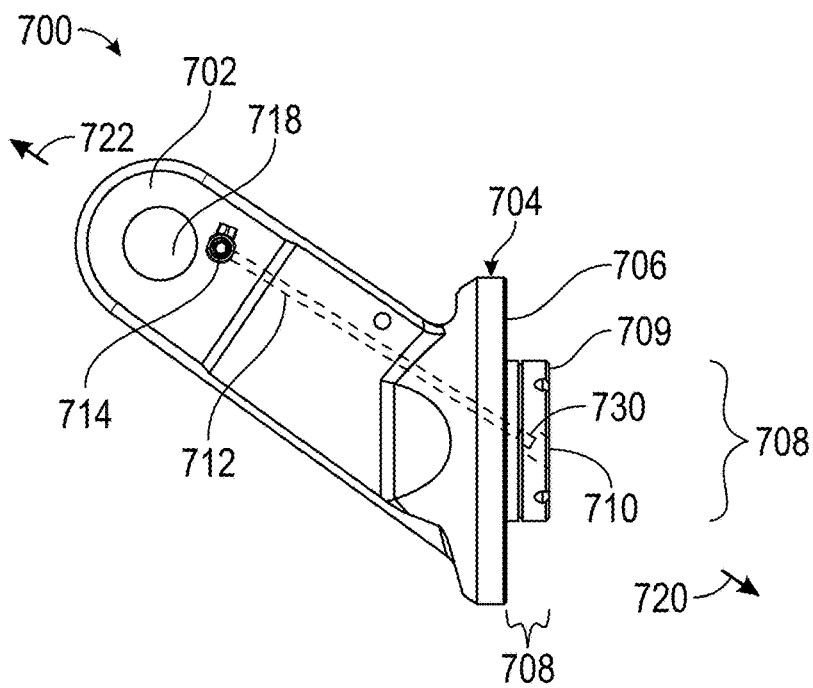
FIG. 7A shows a side view of an embodiment of the yoke.
Figure 7B:
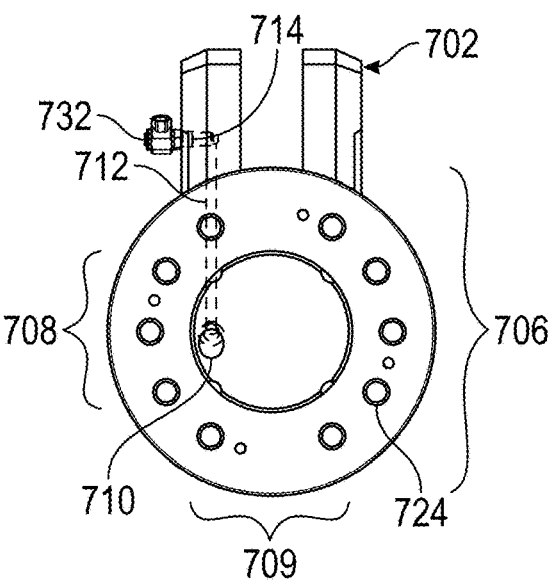
FIG. 7B shows a front, on-axis view of the yoke of FIG. 7A.
Figure 7C:
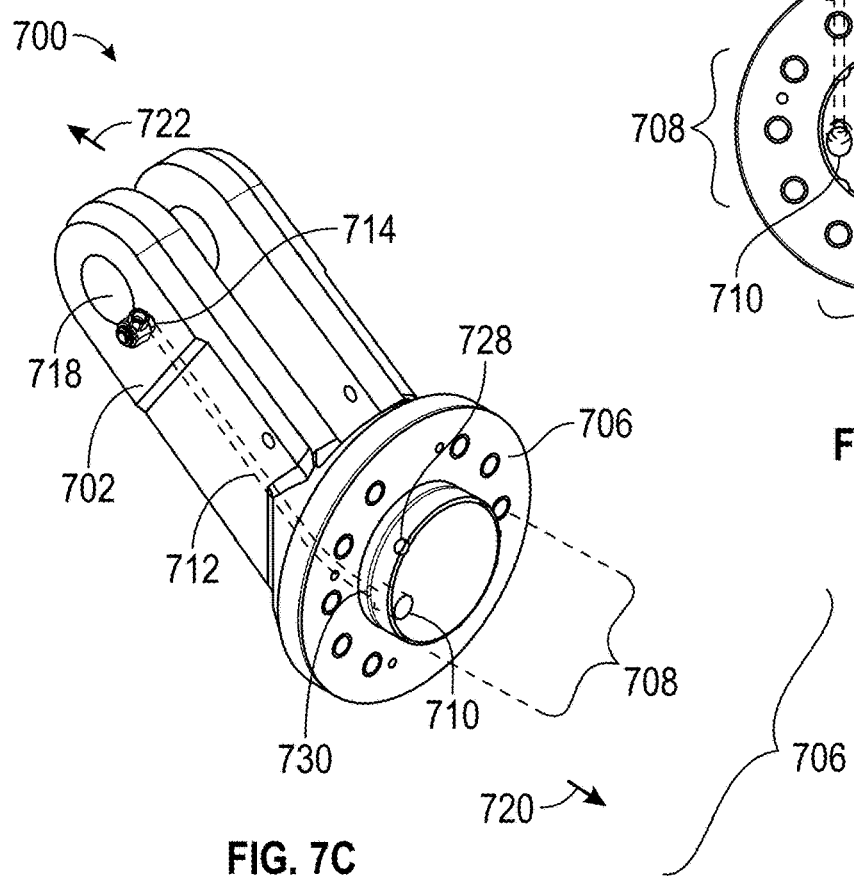
FIG. 7C shows a front, off-axis view of the yoke of FIG. 7A.

FIG. 7A shows a side view of the yoke of the sealing plug assembly. FIGS. 7B and 7C show the front, on-axis view and the front, off-axis view of the yoke in FIG. 7A, respectively. In this embodiment, the yoke 700 includes a yoke proximal end 702 and a yoke distal end 704, wherein the yoke distal end includes a distal yoke face 706, wherein the distal yoke face includes a plurality of yoke bolt holes 724 positioned around a raised yoke portion 708, wherein the raised yoke portion includes a raised yoke face 709, wherein the yoke includes a yoke fluid passageway 712, wherein the yoke fluid passageway connects a distal yoke port 710 to a proximal yoke port 714, wherein the distal yoke port is located on the raised yoke face. In this embodiment, a yoke filter 730 is positioned across the yoke fluid passageway 712 and located closer to the distal yoke port 710 than the proximal yoke port 714. In this embodiment, a swivel fitting 732 is attached to the proximal yoke port 714 and is capable of rotating or swiveling about the proximal yoke port. A pin hole 718 is located in the proximal end of the yoke 700. By convention, when referring to the yoke 700, the proximal direction is 722 and the distal direction is 720. In this embodiment, the raised yoke portion 708 has alignment indentions 728 on the side of the raised yoke portion 708. Referring to FIGS. 5 and 7, in this embodiment, the indentions 728 align with the isolation zone ports 520 when assembled with the isolation plate 500.

Figure 8A:
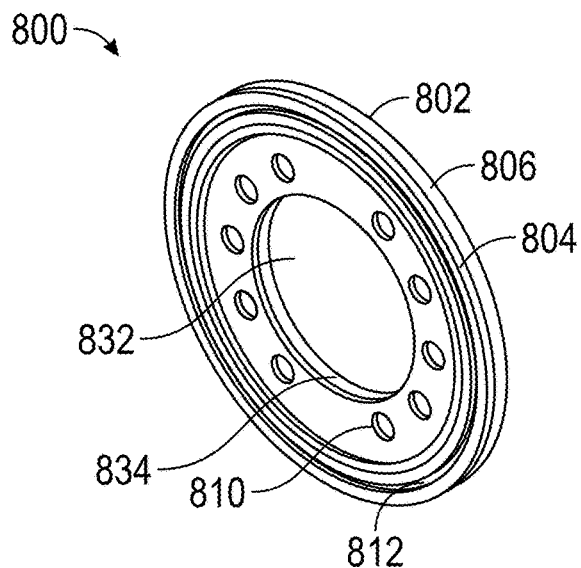
FIG. 8A shows a back, off-axis view of an embodiment of a sealing element of the sealing plug assembly.
Figure 8B:
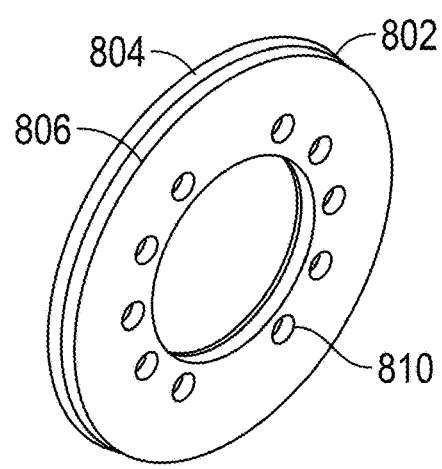
FIG. 8B shows a front, off-axis view of the sealing element of FIG. 8A.
Figure 8C:
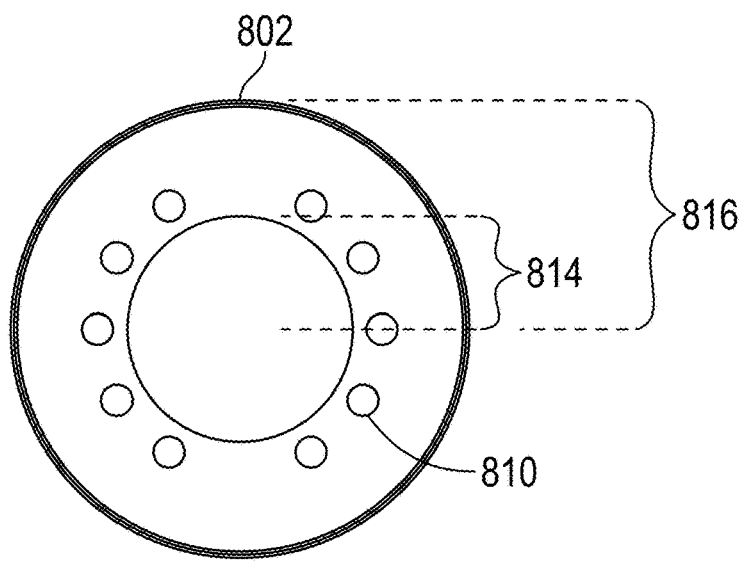
FIG. 8C shows a front, on-axis view of the sealing element of FIG. 8A.

FIG. 8A shows a back, off-axis view of an elastomeric sealing element. FIGS. 8B, 8C, and 8D show a front, off-axis view; a front, on-axis view, and cutaway side view, respectively, of the elastomeric sealing element of FIG. 8A. Referring to FIG. 8A, in this embodiment of the sealing element 800, the sealing element has a clearance hole 832 in the center of the sealing element having an inner edge 834 and an outer edge 802. In this embodiment, between the inner edge 834 and the outer edge 802 are bolt holes 810 through the sealing element 800 that are located at a distance from the center that places them outside of the inner edge 834, inside the outer edge 802, or both. In this embodiment, there is a circular groove 812 that is located closer to the outer edge 802 and further from the center of the sealing element 800 than the bolt holes. In this embodiment, the inner edge 834 is located at an inner radius distance 814 from the center of the sealing element, and the outer edge 802 is located at an outer radius distance 816 from the center of the sealing element 800, and the circular groove 812 is located at a circular groove radius 836 from the center of the sealing element 800. In this embodiment, the circular groove radius 836 is greater than the inner radius distance 814 and less than the outer radius distance 816.

Referring to FIG. 8D, this embodiment of the sealing element includes an elastomeric face 804 and a flat face 806. In this embodiment of the sealing element, the inner edge 834 of the sealing element has an inner edge axial thickness 838, the outer edge of the sealing element has an outer edge axial thickness 840, and the circular groove 812 has a groove depth 842. In this embodiment of the sealing element, the circular groove 812 is located at a radial distance 824 from the outer edge of the sealing element. The elastomeric face 804 of the elastomeric sealing element has a raised rubber ridge 830 located inside of the circular groove 812. In this embodiment of the sealing element, the sealing element includes an elastomeric layer 844, which makes up the elastomeric face 804, and a fabric layer 848, which makes up the flat face 806.

Referring to FIG. 8E, this embodiment of the sealing element includes an elastomeric face 804 and a flat face 806. In this embodiment of the sealing element, the inner edge 834 of the sealing element has an inner edge axial thickness 838, the outer edge of the sealing element has an outer edge axial thickness 840, and the circular groove 812 has a groove depth 842. In this embodiment of the sealing element, the circular groove 812 is located at a radial distance 824 from the outer edge of the sealing element. The elastomeric face 804 of the elastomeric sealing element has a raised rubber ridge 830 located inside of the circular groove 812. In this embodiment of the sealing element, the sealing element includes an elastomeric layer 844, which makes up the elastomeric face 804, a rubber layer 846, which makes up the flat face 806, and a fabric layer 848 that is located between the elastomeric layer 844 and the rubber layer 846. Having discussed the parts of the system above, the system is discussed in more detail below.

The present disclosure provides a sealing plug assembly. In some embodiments, the sealing plug assembly includes: a yoke, a proximal sealing element, a distal sealing element, an isolation plate, and a nose piece. In some embodiments, the sealing plug assembly includes: a yoke, an isolation plate, and two sealing elements or two rubber gaskets. In some embodiments, the yoke includes a yoke proximal end or yoke attachment end or yoke end having a pin hole. In some embodiments, the yoke includes a yoke distal end or yoke boss end or yoke end having a protrusion. In some embodiments, the yoke includes a yoke stem connecting the yoke proximal end to the yoke distal end, wherein the yoke stem has a yoke stem top, a yoke stem bottom, and yoke stem left side, and a yoke stem right side, as viewed looking from the yoke distal end to the yoke proximal end. In some embodiments, the yoke has a longest distance of about 1.7 cm to about 107.0 cm. It is understood by those skilled in the art that the measurements of the sealing plug assembly, and its components, are scaled in size to accommodate and complement the internal diameter of the pipe to be line stopped.

In some embodiments, the yoke distal end includes a distal yoke face or distal yoke surface having a raised yoke portion located on, within, surrounded by, or protruding from the distal yoke face. In some embodiments, the distal yoke face surrounds the raised yoke portion. In some embodiments, the distal yoke face is flat, smooth, or both. In some embodiments, from about 80% to 100% of the area of the distal yoke face is flat and smooth, with the exception of the bolt holes and the raised yoke portion. In some embodiments, the distal yoke face has a circular edge, a smooth edge, or has one or more flat edges forming a polygonal edge, which can include a hexagonal edge, an octagonal edge, or a dodecagonal edge. In some embodiments, the distal yoke face contains one or more yoke bolt holes, which if there are bolt holes located within the raised yoke portion, can be referred to as yoke outer bolt holes. In some embodiments, the distal yoke face can have a diameter or longest distance of 1.7 cm to 107.1 cm, depending on the diameter of the pipe being line stopped. In some embodiments, the yoke bolt holes, or yoke outer bolt holes, are positioned or located around the raised yoke portion. A benefit of the distal yoke face can be to provide a smooth or flat surface for forming an effective seal with the proximal sealing element.

In some embodiments, the yoke is pivotally coupled to a control bar head by a pivot pin. In some embodiments, the pivot pin enables the sealing plug assembly to transition from the insertion mode or extended orientation of FIG. 2 to the sealing mode or contracted orientation of FIG. 1, when the sealing plug assembly is inserted into the pipe by the control bar.

In some embodiments, the yoke includes a raised yoke portion, wherein the raised yoke portion is a portion of the yoke distal face that protrudes from the yoke distal face. In some embodiments, the yoke includes a yoke distal end which includes a yoke distal face and a raised yoke portion. In some embodiments, the raised yoke portion includes a raised yoke portion side and a raised yoke face, wherein the raised yoke face is a top of the raised yoke portion. In some embodiments, the raised yoke portion has a raised yoke portion shape that protrudes from the surface of the yoke distal end and is surrounded by the yoke distal face. In some embodiments, the raised yoke portion shape is cylindrical. In some embodiments, the raised yoke portion shape has one or more flat sides. In some embodiments, the raised yoke face is a top of the raised yoke portion. In some embodiments, the raised yoke face is flat, smooth, or flat and smooth. In some embodiments, the raised yoke portion includes one or more bolt holes or yoke inner bolt holes. In some embodiments, from about 80% to 95% the raised yoke face area is flat and smooth, with the optional exception of the yoke inner bolt holes. In some embodiments, the raised yoke portion side forms an angle of from about 45 degrees to 90 degrees with the distal yoke face, the raised yoke face, or both. In some embodiments, the raised yoke face has a circular edge or a polygonal edge. In some embodiment, the raised yoke face has a diameter or longest measurement of the of about 0.5 cm to about 85.0 cm, provided the raised yoke portion measurement is less than the diameter or longest measurement of the yoke distal face. A benefit of the raised yoke portion can be providing a protrusion for supporting, mounting, or fastening the other components of the sealing plug assembly onto raised yoke portion. For example, the proximal sealing element, the distal sealing element, and the isolation plate, can be mounted onto the raised yoke portion during formation of the sealing plug assembly.

In some embodiments, the raised yoke portion has a raised yoke height of about from about 1.8 cm to about 10.2 cm, as measured from the surface of the distal yoke face to the edge of the raised yoke face. A benefit of the raised yoke portion can be providing a surface for the isolation plate zone. In some embodiments, the raised yoke height can range from about 0.1 to 5.0 mm less than the cylindrical recessed depth of the isolation plate to provide a plate isolation zone between the distal yoke face the isolation plate. In some embodiments, the raised yoke portion and the cylindrical recessed portion of the isolation plate have complementary shapes and dimensions. In some embodiments, the raised yoke face contains, includes, or surrounds a yoke distal port, wherein the yoke distal port is an opening in the raised yoke face that connects to a yoke fluid passageway within the yoke.

In some embodiments, the yoke includes a yoke fluid passageway or yoke fluid channel, that extends from a proximal port to a yoke distal port. In some embodiments, the yoke distal port is located on, opens within, or is surrounded by the raised yoke face. In some embodiments, the yoke includes a stem connecting the yoke distal end to the yoke proximal end. In some embodiments, the yoke proximal port is an opening along the yoke stem that connects, directly or indirectly, to a yoke fluid passageway within the yoke. In some embodiments, the yoke proximal port is located on a side of the yoke, on the yoke stem top, the yoke stem bottom, the yoke stem left side, or the yoke stem right side, or any combination thereof, as viewed along an axis passing through the center of the yoke distal face. In some embodiments, yoke fluid passageway is contained within the yoke from the yoke distal port to the yoke proximal port. In some embodiments, a portion of the yoke fluid passageway extends from the yoke distal port through the yoke and connects to an intermediate port located on the yoke stem between the yoke distal port and the yoke proximal port. In this embodiment, a yoke tube or yoke pipe attaches to the intermediate port and connects or fluidly connects the intermediate port to the yoke proximal port. In some embodiments, the yoke proximal port connects directly to a bleed tubing.

In some embodiments, the yoke proximal port connects directly or indirectly to a swivel fitting. In some embodiments, the yoke proximal port includes, is attached, or fastened to a swivel fitting or rotating adapter. In some embodiments, the swivel fitting is configured to rotate or capable of rotating or swiveling about the yoke proximal port. A benefit of the swivel fitting can be relieving torque exerted by the bleed tubing when the sealing plug assembly is raised or lowered through the housing of the line stop assembly.

In some embodiments, the yoke includes a yoke filter across the yoke fluid passageway, and wherein the yoke filter is located closer to the yoke distal port than the yoke proximal port. In some embodiments, the yoke or yoke fluid passageway excludes any filter or valve between the yoke distal port and the yoke proximal port. In some embodiments, the yoke filter is located from about 0.1 cm to about 5.0 cm from the distal yoke port. A benefit of the yoke filter can be to prevent or reduce the number and/or size of particles in the product from passing through the yoke fluid passageway.

Aline stop assembly is disclosed herein. In some embodiments, the line stop assembly includes a housing, a bleed tubing, and a sealing plug assembly, as disclosed herein, or any combination thereof. In some embodiments, the sealing plug assembly includes a plugging head, wherein the plugging head includes a sealing plug assembly, as discussed above, wherein the sealing plug assembly is connected to or mounted onto a control bar head by a fastener, such as a pivot pin. In some embodiments of the sealing plug assembly, the control bar head is mounted on or attached to a control bar, wherein at least a portion of the control bar extends through the top of the housing. In some embodiments, the housing is a metal containment vessel having 3 or more openings. In some embodiments, the housing includes a housing port that connects to an inner housing port. In some embodiments, the housing port is a passage through the housing and the inner housing port is a fitting capable of being reversibly fastened to or sealed to the pressure tubing. In some embodiments, the housing port is a passage through the housing and the inner housing port is a portion of the bleed tubing that is attached to or sealed to the housing port.

In some embodiments, the bleed tubing, or flexible tubing, includes or is made of an elastomeric or rubber material. In some embodiments, the bleed tubing, or flexible tubing, includes or is made of a steel alloy, an iron alloy, a chrome alloy, a molybdenum alloy, a nickel alloy, or any alloy or combination thereof. Suitable materials for the bleed tubing include duplex stainless steel or austenitic stainless steel. A suitable bleed tubing provides enough flexibility for the plugging head to go from a retracted to an extended position while remaining rigid enough to not collapse under high pressures around 1500-2300 psi (10,342 kPa to 15,857 kPa). A benefit of bleed tubing can be to withstand the pressure of the product in the housing so as to effectively allow for trapped product to flow from the sealing plug assembly out through the bleed valve. A benefit of the bleed tubing can be to connect the bleed valve and/or bleed pressure gauge to the isolation zone of the sealing plug assembly, which can allow for the pressure within the isolation zone to be measured, monitored, controlled, or any of combination thereof, continuously or in real-time. A benefit of the bleed tubing can be allowing for the isolation zone to be backfilled with a vacuum or a fluid, such as a liquid or gas. A benefit of backfilling the isolation zone with a vacuum or an inert fluid, such as hydraulic fluid or nitrogen gas, can be to reinforce the seal and pressure resistance of the sealing plug assembly.

In some embodiments, the bleed valve includes or has one or more pressure valves or pressure regulators attached, directly or indirectly, to the housing port. In some embodiments, the bleed valve is connected, directly or indirectly, to a bleed pressure gauge, wherein the bleed pressure gauge includes an analog pressure gauge or an electronic pressure gauge. In some embodiments, the bleed valve is, directly or indirectly, open to an ambient environment, a vacuum pump, or connected to a container, or any combination thereof. In some embodiments, the container is a fluid container, such as a gas container or a liquid container.

In some embodiments, the top of the control bar head connects to a control bar. In some embodiments, the control bar extends through a top of the inner surface of the housing to outer surface of the housing, wherein the top of the inner surface of the housing contains a housing guide. In some embodiments, the housing guide protrudes a housing guide distance from the inner surface of the housing toward the control bar head. In some embodiments, the housing guide extends a housing guide distance of from about 5.0 cm to about 50.0 cm. In some embodiments, the control bar head includes a control bar head pocket, wherein the control bar head pocket recesses a control head pocket depth within the control bar head away from the housing guide. In some embodiments, the control bar head pocket recesses a control head pocket depth from about 5.0 cm to about 50.0 cm away from the housing top inner surface. A benefit of the housing guide and the control bar head pocket, as well as having the bleed tube coil wrapped around and extend along the control bar, can be to have these features work together to control or guide the positioning of bleed tubing when the control bar head is raised. A benefit of the control bar head pocket can be to serve as a storage space when the sealing plug assembly is in the contracted position or raised position within the housing as shown in FIG. 2.

In some embodiments, the isolation plate is discoidal and has a distal face of the isolation plate, or isolation plate distal surface, having a cylindrical raised portion, wherein the cylindrical raised portion protrudes from and is surrounded by the distal face of the isolation plate. In some embodiments, the cylindrical raised portion has a cylindrical raised portion top. In some embodiments, the cylindrical raised portion top is smooth or flat or both. In some embodiments, the cylindrical raised portion top has a center that is coaxial with the center of the raised yoke face of the sealing plug assembly. In some embodiments, the isolation plate has a proximal face of the isolation plate, or isolation plate proximal surface, having an isolation plate raised inner ring that is coaxial with the center or axis of the cylindrical raised portion, and surrounds a cylindrical recessed portion, or isolation plate cylindrical recessed portion, having an isolation plate recessed bottom. In some embodiments, the isolation plate recessed bottom is flat, circular, smooth, or any combination thereof. In some embodiments, the cylindrical recessed portion has a position that is complementary to the raised isolation plate portion of the isolation plate, or complementary to the raised yoke portion of the yoke, or both.

In some embodiments, the isolation plate has a cylindrical raised portion height of from about 1.8 cm to about 10.2 cm, as measured from the bottom of the cylindrical raised portion to the top of the cylindrical raised portion. In some embodiments, the isolation plate has a cylindrical recessed portion depth of from about 1.8 cm to about 10.2 cm, as measured from the proximal face of the isolation plate to the isolation plate recessed bottom, or about 3.2 cm to about 40.4 cm as measured from the top of the isolation plate raised inner ring to the isolation plate recessed bottom, or any combination thereof.

In some embodiments, the isolation plate contains a radial fluid passageway, or axial fluid passage, that connects the isolation plate radial port to the isolation zone port. In some embodiments, the isolation plate has one or more, or 2, 3, 4, 5, 6, 7, 8, 9, 10, 11, 12, 13, 14, 15, or 16, isolation radial ports located around the outer edge of the isolation plate. In some embodiments, the isolation plate contains 2, 3, 4, 5, 6, 7, 8, 9, 10, 11, 12, 13, 14, 15, or 16 radial fluid passageways, wherein the radial fluid passageways radiate out from the center of the isolation plate and connect at least one isolation plate radial port to at least one isolation zone port. In some embodiments, one or more radial fluid passageways connect one or more isolation plate radial ports, located along on an outer edge of the isolation plate, to one or more isolation zone ports, located along the cylindrical recessed portion of the isolation plate. In some embodiments, one isolation radial port is connected to only one isolation zone port by one radial fluid passageway. A benefit of the isolation plate can be to act as a spacer between the proximal sealing element and the distal sealing element as well as between the yoke and the nose piece. Another benefit of the isolation plate can be to provide radial fluid passageways that connect or fluidly connect the radial fluid passageways to the isolation plate zone, wherein the isolation plate zone is formed by a space or gap between the raised yoke face and the cylindrical recessed portion of the isolation plate, allowing a fluid to flow from the isolation zone through the radial fluid passageways to the distal yoke port.

In some embodiments of the isolation plate, the isolation plate can have a number of isolation plate bolt holes distributed around the center of the isolation plate at a bolt distance from the center of the isolation plate. In some embodiments of the isolation plate, the outer edge of the isolation plate can have a diameter of 1.7 cm to 107.1 cm. In some embodiments of the isolation plate, the cylindrical raised portion top can have a diameter of about 0.5 cm to about 85.0 cm and a cylindrical raised portion height of about 1.0 cm to about 3.0 cm. In some embodiments, the isolation plate can have a cylindrical recessed portion having a diameter of about 0.5 cm to about 5.0 cm and an isolation plate recessed bottom depth of about 1.0 cm to about 3.0 cm. In some embodiments, the isolation plate can further include an axial passage, located along a center axis, and extending from the raised cylindrical surface to the recessed cylindrical surface. In some embodiments of the isolation plate, the cylindrical raised portion can terminate in a surface that is flat, curved, or non-planar.

In some embodiments of the sealing plug assembly, the proximal sealing element, the distal sealing element, or any combination thereof, comprises a flat face and an elastomeric face. In some embodiments, the sealing element includes an outer edge having an exterior radius or exterior diameter, and an inner edge having an interior radius or inner diameter. In some embodiments, the elastomeric face has a circular groove extending a circular groove depth into the elastomeric face. In some embodiments, the inner edge, outer edge, or circular groove, or any combination thereof, of the sealing element are concentric along a central axis extending perpendicular to the sealing element. In some embodiments, to facilitate effective sealing, the circular groove can be coaxially located with the outer edge of the sealing element. In some embodiments, the circular groove is coaxial with the exteriors of the sealing plug assembly, the yoke, or both.

In some embodiments, the elastomeric face of the sealing element can include a coaxially located circular groove extending a circular groove depth into the elastomeric face. A benefit of the circular groove can be allowing the outer edge of the sealing element to more easily conform to the interior surface of the pipe when the outer edge comes in contact with an inner surface of the pipe, simultaneously forcing the outer edge against the inner peripheral surface of the pipe to achieve more effective sealing than sealing elements without such a circular groove. Without wishing to be bound by theory, it is believed that the absence of material in the circular groove allows for the elastomeric material of the sealing element to more easily change its shape to adapt to the space between the exterior of a sealing plug and the interior of a pipe, relative to a sealing element without such a circular groove.

In some embodiments, the diameter of the sealing element can be in a range of from about 5.0 cm to about 150.0 cm, including from about 7.6 cm to about 142.3 cm. In some embodiments, an outer edge of the circular groove of the sealing element is located a radial distance of from about 1.2 cm to about 15.3 cm from the outer edge of the sealing element. In some embodiments, depth of the circular groove of the sealing element can range from about 0.5 cm to about 4.5 cm, including from about 0.6 cm to about 3.9 cm.

As can be understood by those skilled in the art, the exterior diameter of the proximal or distal sealing element can depend on or complement the size of the pipe. For example, the exterior diameter of the sealing element can be slightly higher than an inner diameter of the pipe to achieve an effective seal. Generally, the diameter or radius of the sealing element is not limited, so long as the sealing element has an outer edge that is capable of protruding from the sealing plug that the sealing element is inserted into and so long as the circular groove extends beyond the edge of the sealing plug that the sealing element is inserted into.

As can be understood by those skilled in the art, the outer edge axial thickness of embodiments of the sealing element can depend on pressure of the product in the pipe. For example, when pressure of the product in the pipe is low, a lower outer edge axial thickness may be sufficient to achieve an effective seal. However, when pressure of the product in the pipe is high, a higher outer edge axial thickness may be required to achieve an effective seal. In some exemplary embodiments, the outer edge of the sealing element can have an outer edge axial thickness in a range of from about 1.0 cm to about 15.0 cm, including from about 1.8 cm to about 10.2 cm. In some embodiments, the inner edge of the sealing element can have an inner edge axial thickness in a range of about 1.0 cm to 15.0 cm, including from about 1.2 cm to about 10.2 cm.

In some embodiments, the proximal sealing element and the distal sealing element can be the same or different. In some embodiments, the proximal sealing element and the distal sealing element can have the same or similar dimensions but made of different materials. In some embodiments, the proximal sealing element and the distal sealing element can have same or similar materials with identical dimensions. In some embodiments, the distal sealing element can include a flat face, an elastomeric face, an outer edge having an exterior radius, and an inner edge having an interior radius. In some embodiments, the sealing element can be made of an elastomer and at least a portion of the flat face can include a fabric, such as cotton, polyester, or nylon. In some embodiments, the elastomeric face (seal side) faces upstream or the proximal direction within the sealing plug assembly while the fabric aside faces the downstream or distal direction within the sealing plug assembly.

It has been discovered that the incorporation of a rubber layer on the back of the fabric layer of the distal sealing element and the proximal sealing element can provide a better seal when pressed against a raised surface.

In some embodiments of the sealing plug assembly, the isolation plate can have an isolation plate raised outer ring on the proximal side of the isolation plate, such that the raised outer isolation plate ring can press against the rubber layer of the proximal sealing element to provide a superior seal, relative to the same isolation plate raised outer ring pressed against the fabric layer of the proximal sealing element, and/or relative to the same proximal sealing element pressing against an isolation plate without an isolation plate raised outer ring. In some embodiments of the sealing plug assembly, the nose piece can have a nose piece raised ring on the proximal side of the nose piece, such that the nose piece raised ring can press against the rubber layer of the distal sealing element to provide a superior seal, relative to the same nose piece raised ring pressed against the fabric layer of a distal sealing element and/or the distal sealing pressing against a nose piece without a nose piece raised ring.

In some embodiments, the distal sealing element and the proximal sealing element can include an elastomeric face that includes an elastomeric material, a flat face that includes a fabric layer and a rubber layer, wherein the fabric layer is in direct contact with the elastomeric layer and the rubber layer. In some embodiments, the distal sealing element and the proximal sealing element can include a fabric layer adhered to an elastomeric layer on one side and a rubber layer adhered to a side opposite of the fabric layer. In some embodiments, material of the elastomeric layer can be the same or different from the material of the rubber layer. In some embodiments, the distal sealing element and the proximal sealing element can include a flat fabric layer bound to a flat rubber layer, wherein the flat fabric layer is bound to a shaped elastomeric layer.

In some embodiments the sealing plug assembly, the yoke, the isolation plate, the proximal nose ring, the distal nose ring, and the nose piece are made of metal or a metal alloy, and optionally exclude any other material. In some embodiments of the line stop assembly, the housing is made of metal or a metal alloy, and optionally excludes any other material.

In some embodiments of the line stop assembly, the isolation radial port of the isolation plate is connected or fluidly connected by a radial fluid pathway to the isolation zone port. In some embodiments of the line stop assembly, the isolation zone port of the isolation plate is connected or fluidly connected by the plate isolation zone to the yoke distal port. In some embodiments of the line stop assembly, the plate isolation zone is located between the isolation plate, cylindrical recessed portion of the isolation plate, and the raised yoke face. In some embodiments of the line stop assembly, the yoke distal port is connected or fluidly connected to the yoke proximal port by the yoke fluid passageway. In some embodiments of the line stop assembly, the yoke proximal port is connected, fluidly connected, or configured to be directly or indirectly connected to the inner housing port by the bleed tubing. For example, the proximal yoke port may be connected or fluidly connected to the bleed tubing by a swivel fitting. In some embodiments of the line stop assembly, the housing port is fluidly connected to the bleed valve. In some embodiments of the line stop assembly, the isolation radial port is fluidly connected to the bleed valve, such that product can flow from the isolation zone to the bleed pressure valve by passing through components of the line stop assembly, including the isolation plate, the yoke fluid passageway, the bleed tubing, or any combination thereof.

A method of stopping a pipe containing a product is disclosed herein. In some embodiments, the method includes providing a sealing plug assembly, as disclosed herein, or a line stop assembly, as disclosed herein; and stopping or plugging the pipe containing the product by sealing an outer edge of the proximal sealing element and an outer edge of the distal sealing element against an interior surface of the pipe. In some embodiments, the method includes providing a sealing plug assembly, as disclosed herein, or line stop assembly, as disclosed herein; and forming an isolation zone between an interior of the pipe and the isolation plate by stopping the pipe. In some embodiments, the method includes providing a sealing plug assembly, as disclosed herein, or line stop assembly, as disclosed herein; and stopping the pipe by inserting the sealing plug assembly into the pipe. In some embodiments, the method includes providing a sealing plug assembly, as disclosed herein, or a line stop assembly, as disclosed herein; and by inserting the sealing plug assembly into the pipe. In some embodiments, the method includes providing a sealing plug assembly, as disclosed herein, or a line stop assembly, as disclosed herein; and stopping or plugging the pipe containing the product by sealing one or two rubber seals (rubber containing gaskets) against an interior surface of the pipe.

In some embodiments, the method of stopping a pipe containing a product includes providing a line stop assembly, as disclosed herein; and forming an isolation zone between an interior of the pipe and the isolation plate by stopping the pipe; and removing the product from the isolation zone by flowing the product from the isolation zone to the bleed valve, flowing the product from the isolation zone to the bleed valve by flowing the product from the isolation zone into the radial fluid pathway, from the radial fluid pathway into the plate isolation zone, from the plate isolation zone into the yoke fluid passageway, from the yoke fluid passageway into the bleed tubing, from the bleed tubing into the inner housing port, or from the inner housing port to the bleed valve, or any combination thereof.

EXAMPLES

All of the pieces shown in FIGS. 1 and 3A are manufactured in compatible sizes and assembled as shown. The sealing elements shown in FIGS. 8A, 8B, 8C, 8D, and 8E are manufactured by cutting a circular groove into a commercially available sealing element.

What is claimed is:

1. A sealing plug assembly comprising:
    a yoke, wherein the yoke includes a yoke proximal end and a yoke distal end, wherein the yoke distal end includes a distal yoke face, wherein the distal yoke face includes a plurality of yoke bolt holes positioned around a raised yoke portion,
wherein the raised yoke portion includes a raised yoke face,
    wherein the yoke includes a yoke fluid passageway, wherein the yoke fluid passageway connects a yoke distal port to a yoke proximal port, and
    wherein the yoke distal port is located on the raised yoke face.

2. The sealing plug assembly of claim 1, further comprising:
    a proximal sealing element, a distal sealing element, an isolation plate, and a nose piece,
    wherein the proximal sealing element is located closer to the yoke than the distal sealing element, and wherein the proximal sealing element protrudes around an exterior of the sealing plug assembly,
    wherein the distal sealing element is located closer to the nose piece than the proximal sealing element, and wherein the distal sealing element protrudes around the exterior of the sealing plug assembly, and
    wherein the isolation plate is contained in an interior of the sealing plug assembly and located between the proximal sealing element and the distal sealing element.

3. The sealing plug assembly of claim 1,
    wherein the distal yoke face is flat; or
    wherein the distal yoke face is circular; or
    wherein the raised yoke face is flat; or
    wherein the raised yoke face is circular; or
    wherein the raised yoke face is located in a center of the distal yoke face; or
    wherein the yoke proximal port is located on a side of the yoke; or
    wherein the yoke proximal port is located closer to the yoke proximal end than the yoke distal end; or any combination thereof.

4. The sealing plug assembly of claim 1, wherein the yoke proximal port includes or is attached to a swivel fitting, wherein the swivel fitting is capable of rotating or swiveling about the yoke proximal port; or wherein the yoke includes a yoke filter across the yoke fluid passageway, and wherein the yoke filter is located closer to the yoke distal port than the yoke proximal port.

5. A line stop assembly comprising:
    the sealing plug assembly of claim 1, and
    a housing, wherein the housing includes a housing port that connects an inner housing port to a bleed valve, wherein the inner housing port is located on an inner surface of the housing and the bleed valve is located on an outer surface of the housing, and
    bleed tubing, wherein the bleed tubing connects the yoke proximal port to the inner housing port.

6. The line stop assembly of claim 5, comprising a plugging head, wherein the plugging head includes the yoke connected by a pin to a control bar head, and
    wherein the yoke is capable of pivoting about the yoke proximal end relative to the control bar head, and
    wherein the control bar head connects to a control bar, and the control bar extends through a top of the inner surface of the housing, wherein the top of the inner surface of the housing contains a housing guide,
    wherein the housing guide protrudes a housing guide distance from the inner surface of the housing toward the control bar head, and
    wherein the control bar head includes a control bar head pocket, wherein the control bar head pocket recesses a control head pocket depth within the control bar head away from the housing guide.

7. The line stop assembly of claim 5, wherein the bleed valve is connected to a bleed pressure gauge, or
    wherein the bleed valve is open to an ambient environment or connected to a container, or any combination thereof.

8. The line stop assembly of claim 5, wherein the bleed valve is fluidly connected to the yoke distal port by the yoke fluid passageway, the bleed tubing, or any combination thereof.

9. A line stop assembly comprising:
    the sealing plus assembly of claim 1, further comprising a proximal sealing element, a distal sealing element, an isolation plate, and a nose piece; and
    a housing, and bleed tubing,
    wherein the proximal sealing element is located closer to the yoke than the distal sealing element, and wherein the proximal sealing element protrudes around an exterior of the sealing plug assembly,
    wherein the distal sealing element is located closer to the nose piece than the proximal sealing element, and wherein the distal sealing element protrudes around the exterior of the sealing plug assembly,
    wherein the isolation plate is contained in an interior of the sealing plug assembly and located between the proximal sealing element and the distal sealing element,
    wherein the housing includes a housing port that connects an inner housing port to a bleed valve, wherein the inner housing port is located on an inner surface of the housing and the bleed valve is located on an outer surface of the housing, and
    wherein the isolation plate includes a cylindrical raised portion on a distal face of the isolation plate, a cylindrical recessed portion on a proximal face of the isolation plate, and one or more radial fluid pathways, wherein the radial fluid pathways connect an isolation plate radial port to an isolation zone port, wherein the isolation plate radial port is located on an outer edge of the isolation plate and the isolation zone port is located on an inner edge of the cylindrical recessed portion of the isolation plate, and wherein a plate isolation zone is a space located between the isolation plate and the raised yoke face; and wherein the isolation plate radial port is fluidly connected by the radial fluid pathway to the isolation zone port, wherein the isolation zone port is fluidly connected by the plate isolation zone to the yoke distal port, wherein the yoke distal port is fluidly connected to the yoke proximal port by the yoke fluid passageway, wherein the yoke proximal port is fluidly connected to the inner housing port by the bleed tubing, and wherein the housing port is fluidly connected to the bleed valve.

10. A line stop assembly comprising:

the sealing plug assembly of claim 1, further comprising a proximal sealing element, a distal sealing element, an isolation plate, and a nose piece;

a housing; and bleed tubing;

wherein the proximal sealing element is located closer to the yoke than the distal sealing element, and wherein the proximal sealing element protrudes around an exterior of the sealing plug assembly, wherein the distal sealing element is located closer to the nose piece than the proximal sealing element, and wherein the distal sealing element protrudes around the exterior of the sealing plug assembly, wherein the isolation plate is contained in an interior of the sealing plug assembly and located between the proximal sealing element and the distal sealing element, wherein the housing includes a housing port that connects an inner housing port to a bleed valve, wherein the inner housing port is located on an inner surface of the housing and the bleed valve is located on an outer surface of the housing, and wherein the isolation plate includes a cylindrical raised portion on a distal face of the isolation plate, a cylindrical recessed portion on a proximal face of the isolation plate, and one or more radial fluid pathways, wherein the radial fluid pathways connect an isolation plate radial port to an isolation zone port, wherein the isolation plate radial port is located on an outer edge of the isolation plate and the isolation zone port is located on an inner edge of the cylindrical recessed portion of the isolation plate, and wherein a plate isolation zone is a space located between the isolation plate and the raised yoke face; and wherein the isolation plate radial port is fluidly connected to the bleed valve.

11. A yoke for a sealing plug assembly comprising:

a yoke, wherein the yoke includes a yoke proximal end and a yoke distal end, wherein the distal end includes a distal yoke face, wherein the distal yoke face includes a plurality of yoke bolt holes positioned around a raised yoke portion, wherein the raised yoke portion includes a raised yoke face, wherein the yoke contains a yoke fluid passageway, wherein the yoke fluid passageway connects a yoke distal port to a yoke proximal port, and wherein the yoke distal port is located on the raised yoke face.

12. A method of stopping a pipe containing a product, comprising:

providing a sealing plug assembly, wherein the sealing plug assembly includes a yoke, a proximal sealing element, a distal sealing element, an isolation plate, and a nose piece, wherein the yoke includes a yoke proximal end and a yoke distal end, wherein the distal end includes a distal yoke face, wherein the distal yoke face includes a plurality of yoke bolt holes positioned around a raised yoke portion, wherein the raised yoke portion includes a raised yoke face, wherein the yoke contains a yoke fluid passageway, wherein the yoke fluid passageway connects a yoke distal port to a yoke proximal port, and wherein the yoke distal port is located on the raised yoke face;

wherein the proximal sealing element is located closer to the yoke than the distal sealing element, and wherein the proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element; and stopping the pipe containing the product by sealing an outer edge of the proximal sealing element and an outer edge of the distal sealing element against an interior surface of the pipe.

13. The method of claim 12, further comprising:

providing a line stop assembly, wherein the line stop assembly includes the sealing plug assembly and a housing and bleed tubing, and wherein the housing includes a housing port that connects an inner housing port to a bleed valve, wherein the inner housing port is located on an inner surface of the housing and the bleed valve is located on an outer surface of the housing, and wherein the isolation plate includes a cylindrical raised portion on a distal face of the isolation plate, a cylindrical recessed portion on a proximal face of the isolation plate, and one or more radial fluid pathways, wherein the radial fluid pathways connect an isolation plate radial port to an isolation zone port, wherein the isolation plate radial port is located on an outer edge of the isolation plate and the isolation zone port is located on an inner edge of the cylindrical recessed portion of the isolation plate, and wherein a plate isolation zone is a space located between the isolation plate and the raised yoke face.

14. The method of claim 13, further comprising:

forming an isolation zone between an interior of the pipe and the isolation plate by stopping the pipe; and removing the product from the isolation zone by flowing the product from the isolation zone to the bleed valve.

15. The method of claim 14, further comprising:

flowing the product from the isolation zone to the bleed valve by flowing the product from the isolation zone into the radial fluid pathway, from the radial fluid pathway into the plate isolation zone, from the plate isolation zone into the yoke fluid passageway, from the yoke fluid passageway into the bleed tubing, from the bleed tubing into the inner housing port, and from the inner housing port to the bleed valve.

16. The method of claim 14, further comprising:

flowing the product from the bleed valve into a container; or flowing a gas or a liquid from the bleed valve into the isolation zone; or flowing the product from the bleed valve into a container, and then flowing the gas or liquid from the bleed valve into the isolation zone.

\* \* \* \* \*